United States Patent [19]
Mohri

[11] Patent Number: 6,032,111
[45] Date of Patent: Feb. 29, 2000

[54] METHOD AND APPARATUS FOR COMPILING CONTEXT-DEPENDENT REWRITE RULES AND INPUT STRINGS

[75] Inventor: Mehryar Mohri, New York, N.Y.

[73] Assignee: AT&T Corp., New York, N.Y.

[21] Appl. No.: 08/880,412

[22] Filed: Jun. 23, 1997

[51] Int. Cl.$^7$ .............................. G06F 17/28; G10L 5/06; G10L 9/00

[52] U.S. Cl. ............................................... 704/9; 704/257

[58] Field of Search ................................... 704/1, 9, 255, 704/257, 266

[56] References Cited

U.S. PATENT DOCUMENTS

| | | | |
|---|---|---|---|
| 5,594,641 | 1/1997 | Kaplan et al. | 704/1 |
| 5,625,554 | 4/1997 | Cutting et al. | 704/1 |
| 5,721,939 | 2/1998 | Kaplan | 704/9 |
| 5,806,032 | 9/1998 | Sproat | 704/255 |

OTHER PUBLICATIONS

"Regular Models of Phonological Rule Systems", Ronald M. Kaplan and Martin Kay, ISTL–NLTT–1993–05–01, Oct. 29, 1993.

"Formal Aspects of Phonological Description", pp. 10–17, 20–125, C. Douglas Johnson, University of California, Santa Barbara, 1972.

"An Efficient Compiler for Weighted Rewrite Rules", M. Mohri & R. Sproat, Annual Meeting of the Association for Computational Linguistics, Univ. of Cal., Santa Cruz, CA, Jun. 24–27, 1996.

"Compilation of Weighted Finite–State Transducers from Decision Trees", R. Sproat & M. Riley, Annual Meeting of the Association for Computational Linguistics, Univ. of Cal., Santa Cruz, Santa Cruz, CA, Jun. 24–27, 1996.

*Primary Examiner*—Forester W. Isen
*Assistant Examiner*—Patrick N. Edouard
*Attorney, Agent, or Firm*—Oliff & Berridge, PLC

[57] ABSTRACT

A system and method for compiling weighted context-dependent rewrite rules into weighted finite-state transducers introduces context marking symbols only when and where they are needed. In particular, the compiler and compiling method use a composition of five simple finite-state transducers generated from a weighted context-dependent rewrite rule to represent that rule. An "r" finite-state transducer is generated from the right context portion $\rho$ of the weighted context-dependent rewrite rule. An "f" finite-state transducer is generated from the rewritten portion $\phi$ of the weighted context-dependent rewrite rule. A "Replace" finite-state transducer is generated from the rewritten and replacement portions $\phi$ and $\psi$ of the weighted context-dependent rewrite rule. Finally, "$l_1$" and "$l_2$" finite-state transducers are generated from the left context portion $\lambda$ of the weighted context-dependent rewrite rule. The "r" and "f" finite-state transducer generators of the compiler and the transducer generating steps of the compiling method introduce the context marking symbols "$<_1$", "$<_2$" and ">" in the various finite-state transducers only when and where they are needed. The right context marker symbol ">" is added to the "r" finite-state transducer only immediately before each occurrence of $\rho$. The left context markers "$<_1$" and "$<_2$" are added to the "f" finite-state transducer only immediately before each occurrence of $\phi$, neglecting any occurrences of the right marker symbol ">". The "Replace", "$l_1$" and "$l_2$" finite-state transducers then appropriately remove the right and left context markers when replacing $\phi$ with $\psi$, and whether $\lambda$ precedes $\phi$ in the input string.

28 Claims, 19 Drawing Sheets

$$\text{PROLOGUE} \circ$$

$$\text{Id}(\text{OBLIGATORY}(\phi,<_i,>)) = \text{Id}(\overline{\Sigma^*_{><0} <_i \phi^0_{><} \Sigma^*_{><0}}) \circ$$

$$\text{Id}(\text{RIGHTCONTEXT}(\rho,<,>)) = \text{Id}(\overline{\Sigma^*_{>0} \rho_{>0} \Sigma^*_{>0} \to \Sigma^*_{>0} \cap \overline{\Sigma^*_{>0} \rho_{>0} \Sigma^*_{>0} \to \Sigma^*_{>0}}}) \circ$$

$$\text{REPLACE} = [\text{Id}(\overline{\Sigma^*_{<_i>}}; 0) \text{Opt}(\text{Id}(<a) \phi^0_{<c>_c} \quad x \psi^0_{<c>_c} \quad \text{Id}(>_a))]^* \circ$$

$$\text{Id}(\text{LEFTCONTEXT}(\lambda,<,>)) = \text{Id}((\overline{\Sigma^*_{<0} \lambda_{<0} - \Sigma^*_{<0} << \Sigma^*_{<0}} \cap \overline{\Sigma^*_{<0} \lambda_{<0} - \Sigma^*_{<0} << \Sigma^*_{<0}}))$$

$$\text{PROLOGUE}^{-1}$$

PRIOR ART

*FIG. 1* r:    $\Sigma^* \rho \longrightarrow \Sigma^* > \rho$ f:    $(\Sigma \cup \{>\})^* \phi > \longrightarrow (\Sigma \cup \{>\})^* \{<_1, <_2\} \phi >$ replace:   $<_1 \phi > \longrightarrow <_1 \psi$ $T_1$:   $\Sigma^* \lambda <_1 \longrightarrow \Sigma^* \lambda$ $T_2$:   $\Sigma^* \overline{\lambda} <_2 \longrightarrow \Sigma^* \overline{\lambda}$

FIG. 3A r = [REVERSE(MARKER($\Sigma^*$REVERSE($\rho$),1,$\{>\}$,$\emptyset$))]

f = [REVERSE(MARKER(($\Sigma \cup \{>\})^*$ REVERSE($\phi_,>$),1,$\{<_1,<_2\}$,$\emptyset$))]

$T_1$ = [MARKER($\Sigma^* \lambda$,2,$\phi$,$\{<_1\}$)] <2:<2

$T_2$ = [MARKER($\Sigma^* \lambda$,3,$\phi$,$\{<_2\}$)]

FIG. 3B

COMPILATION TIMES FOR RULES OF THE FORM
$a \rightarrow b/ C^K$ ___, $(k \in [0,10])$ COMPILATION TIMES FOR RULES OF THE FORM
$a \rightarrow b/\_\_\_c^K$, $(k \in [0,10])$

METHOD AND APPARATUS FOR COMPILING CONTEXT-DEPENDENT REWRITE RULES AND INPUT STRINGS

BACKGROUND OF THE INVENTION

1. Field of Invention

This invention is directed to a compiler system and a method for compiling context-dependent rewrite rules with input strings to obtain rewritten output strings. More particularly, this invention is directed to weighted rewrite rules. Specifically, this invention relates to context-dependent weighted rewrite rules for natural language and speech processing.

2. Description of Related Art

Rewrite rules correspond to converting one regular expression into another regular expression. The context-dependent rewrite rules limit the application of the rewrite portion of the rule based on a context portion that defines the regular expressions which precede and/or follow the regular expression to be rewritten. Thus, context-dependent rewrite rules are written as:

$$\phi \rightarrow \psi / \lambda \_ \rho$$

where:

$\phi$ is the regular expression to be replaced, $\psi$ is the regular expression to be inserted in place of $\phi$, $\lambda$ (for "left") is the regular expression which appear to the left of $\phi$, and $\rho$ (for "right") is the regular expression appearing to the right of $\phi$.

It should be appreciated that either $\lambda$ or $\rho$ can be omitted. When either $\lambda$ or $\rho$ are omitted, the rewrite rule is dependent only on the left or right context, and is independent of the other, omitted, context.

Context-dependent rules have additional dependencies beyond those defining the right and left adjacent regular expressions. These include application dependencies and traversal dependencies. The application dependencies include whether the rewrite rule is an obligatory rule or an optional rule. An obligatory rewrite rule is one that must be applied to rewrite $\phi$ as $\psi$ in the string of regular expressions whenever the left and right contexts $\lambda$ and $\rho$ are found. In contrast, in an optional rewrite rule, application of the rewrite rule to the input string is optional.

The traversal dependencies include left-right, right-left, and simultaneous. In a left-right context dependent rewrite rule, the $\lambda$ context precedes $\phi$, the regular expression to be replaced, and the right context $\rho$ follows it. Furthermore, as soon as the proper context $\lambda$ and $\rho$ are identified for the regular expression to be rewritten, $\phi$ can be immediately replaced with $\psi$. In this case, if a second context-dependent rewrite rule used $\phi$ as part or all of its left context $\lambda'$, in a left-right traversal, because $\phi$ is rewritten to $\psi$ by the first rewrite rule, the second rewrite rule using $\phi$ as a portion of its left context would not be applied, as the context $\lambda'$ of that second rule, which includes $\phi$, no longer exists.

In contrast, in a right-left traversal context-dependent rewrite rule, the right context $\rho$ precedes the regular expression to be rewritten, $\phi$, while the left context $\lambda$ follows it. The right-left traversal context-dependent rewrite rule is nonetheless similar to the left-right context-dependent rewrite rule, in that, if $\phi$ forms part or all of another rewrite rule to be applied to the input string of regular expressions, and is rewritten to $\psi$, then the preceding context of that second rewrite rule will not be found.

In contrast to both left-right and right-left context-dependent rewrite rules, simultaneous context-dependent rewrite rules have no "direction" of application. That is, they are applied simultaneously to all ordered subsets of the input string of regular expressions at the same time. Thus, in the examples used above, if two rewrite rules are to be applied simultaneously to an input string, where one of the rewrite rules rewrites the string "λφρ" as "λψρ", and the other rewrite rule rewrites the string "φρρ'" as "φψ'ρ'"),both of these simultaneous rewrite rules will be applied to the input string "λφρρ'" to rewrite it to the output string "λψψ'ρ'."

Context-dependent rewrite rules are often used in natural language and speech processing areas, including morphology, phonology, syntax, text-to-speech processing, and speech recognition. While context-dependent rewrite rules have been most commonly encountered in a natural language and speech processing, context-dependent rewrite rules are not limited to natural language and speech processing.

Context-dependent rewrite rules can be represented by finite-state transducers under the condition that no such rule rewrites its non-contextual part. In other words, when an occurrence of the regular expression $\phi$ is found in a string and replaced with $\psi$, $\psi$ can be used as a left or right context for further replacements, but it cannot be used as part of an occurrence $\phi$ to be replaced.

This condition is equivalent to the one described in *Formal Aspects of Phonological Description*, by C. Douglas Johnson (1972), herein incorporated by reference, that no rule be allowed to apply any more than a phonetic number of times to its own output: both conditions limit the representational power of context-dependent rewrite rules exactly to the set of all finite-state transducers.

Finite-state transducers allow convenient algebraic operations such as union, composition, and projection. Due to their increased computational, finite-state transducers enable very large machines to be built. These machines can be used to model interestingly complex linguistic phenomena.

The use of context-dependent rewrite rules to represent linguistic phenomena is also described by Johnson. As disclosed in "Regular Models of Phonological Rule Systems", Ronald M. Kaplan et al., *Computational Linguistics*, 20:331–378 (1994), herein incorporated by reference, each such rule can be modeled by a finite-state transducer. Furthermore, since regular relations are closed under serial composition, a phonetic set of rules applying to each other's output in an ordered sequence also defines a regular relation. Therefore, a single finite-state transducer, whose behavior simulates the whole set, can be constructed by composing the individual finite-state transducers corresponding to the individual rules. Kaplan then describes a method for converting a context-dependent rewrite rule into a finite-state transducer. In particular, Kaplan's method uses six finite-state transducers for each rule. For each rule, these six finite-state transducers are composed together to create the final finite-state transducer for that rule. For a system of rules, a union of the finite-state transducer for each rule defines the finite-state transducer for the set of rules. As shown in FIG. 1, Kaplan's system includes, for an obligatory left-right context-dependent rewrite rule, a Prologue finite-state state transducer, an Id(Obligatory) finite-state transducer, a Id(Rightcontext) finite-state transducer, a Replace finite-state transducer, a Id(Leftcontext) finite-state transducer and a Prolgue$^{-1}$ finite-state transducer. The Prologue finite-state transducer adds three distinct left marker symbols and three distinct right marker symbols:

$<_a$, $<_i$, $<_c$, and $>_a$, $>_i$, $>_c$, where $<_a$ and $>_a$ define the start and end of a rule application, provided they appear in front of the proper $\phi$, and between the proper $\phi$ and $\rho$, respectively;

$<_i$ and $>_i$ define the identity portions of the strings, the regions between the changes by a replacement relation; and $<_c$ and $>_c$ identify strings which come in the middle or center in another rule application that starts to the left of the $<_c$ and extends to the right of the $>_c$. The Prologue$^{-1}$ finite-state transducer deletes any of the < or > which remain after application of the other finite-state transducers.

FIG. 2A shows the basic finite-state transducer for the obligatory left-right rewrite rule "a→b/c__b." FIG. 2A also indicates how each transition corresponds to the $\phi$, $\psi$, $\lambda$ and $\rho$ regular expressions. In general, the accepted notation for transitions of a finite-state transducer is of the form :β, where is the input string and β is the output string. To simplify the figures described herein, those transitions that output their input string, i.e., transitions that are normally labeled " : ", will be labeled only with the input string, i.e., only as " ". In addition, those transitions that accept and output one of a number of input strings, and thus would normally be labeled " $_1$: $_1$; $_2$: $_2$; . . . ", will be labeled " $_1$, $_2$, . . . ". Furthermore, it should be appreciated that "a", "b" and "c" can be single symbols of an alphabet Σ or strings of single symbols. It should also be appreciated that "d" represents all symbols and/or strings of symbols of Σ other than "a", "b" and "c".

FIG. 2B shows a finite-state transducer corresponding to the input string "cab", to which is to be applied the obligatory left-right rewrite rule "a→b/c__b." FIG. 2C shows the composition of "cab" with Prologue. FIG. 2G shows the finite-state transducer remaining after the other finite-state transducers are composed with the composition of "cab" and Prologue. FIG. 2H shows the composition of the finite-state transducer shown in FIG. 2G with Prologue$^{-1}$.

FIG. 2D shows the composition of Id(Obligatory) with the finite-state transducer shown in FIG. 2C. In particular, as shown in FIG. 2D, the Id(Obligatory) finite-state transducer splits the finite-state transducer shown in FIG. 2C into two paths between the states 1 and 3 such there are two paths "a" and "$<_i$" extending from state 1. Because only the path through state 5 has both the proper right context "b" and the $<_i$, only state 5 has its right markers deleted. Thus, the right markers are removed from state 5.

The Id(Rightcontext) finite-state transducer is then composed with the finite-state transducer shown in FIG. 2D, resulting in the finite-state transducer shown in FIG. 2E. As shown in FIG. 2E, the Id(Rightcontext) finite-state transducer removes the right markers from the remaining states and collapses states 2, 4 and 5 of FIG. 2C into states 2 and 3 of FIG. 2E. Furthermore, states 2 and 3 of FIG. 2E are connected by three paths marked, respectively, $>_a$, $>_i$, and $>_c$.

The Replace finite-state transducer is then composed with the finite-state transducer of FIG. 2E, resulting in the finite-state transducer of FIG. 2F. As shown in FIG. 2F, the Replace finite-state transducer generates two parallel paths between states 1 and 3. The first path contains the original input string path, while the second path contains the rewritten input string. Furthermore, the left and right markers $<_a$, $<_c$, $>_a$ and $>_c$ are removed from states 0–4 while $<_a$ identifies the transition from state 1 to state 5, $<_c$ defines the transitions looping at states 5 and 6, and $>_a$ defines the transition from state 6 to state 3.

The Id(Leftcontext) finite-state transducer is then composed with the finite-state transducer shown in FIG. 2F, resulting in the finite-state transducer of FIG. 2G. Because the left context "c" of the rewrite rule is present, the Id(Leftcontext) finite-state transducer deletes the path which does not contain the replacement, the path from state 1 to state 3 through state 2, as well as deleting the $<_i$ and $<_c$ markers. Then, as noted above, the Prologue$^{-1}$ finite-state transducer is composed with the finite-state transducer shown in FIG. 2G, resulting in the finite-state transducer shown in FIG. 2H.

As apparent from the above-outlined description of Kaplan's method, Kaplan introduces the sets of left and right markers in the Prologue finite-state transducer, only to delete them in the following finite-state transducers depending on whether the proper context is present. Furthermore, the construction of the Id(Obligatory), Id(Rightcontext), and Id(Leftcontext) finite-state transducers involves many operations, including two intersections of automata, two distinct subtractions, and nine complementations. Furthermore, each subtraction itself involves an intersection and a complementation. Thus, in total, four intersections and eleven complementations must be performed for each rule when composing the six finite-state transducers of Kaplan's method with any arbitrary input string.

While intersection and complementation are classical automata algorithms, applying intersection and complementation is very costly. For example, the complexity of intersection is quadratic. Moreover, complementation requires that the input automaton be determinized. In this context, determinization can be very time consuming and lead to automata of very large size. This occurs because the complexity of determinization is exponential.

SUMMARY OF THE INVENTION

This invention therefore provides a system and method for generating finite-state transducers from context-dependent rewrite rules which introduce context marking symbols only when and where they are needed.

This invention further provides a system and method for converting a context-dependent rewrite rule into a finite-state transducer having fewer intermediate finite-state transducers required to construct the finite-state transducer than in Kaplan's method.

This invention additionally provides a system and method for converting a context-dependent rewrite rule into a finite-state transducer more directly and efficiently from the primitive expressions $\phi$, $\psi$, $\lambda$ and $\rho$ of the rule.

The system and method for converting a context-dependent rewrite rule into a finite-state transducer includes a right context marking finite-state transducer r, a $\phi$-marking finite-state transducer f, a simplified Replace finite-state transducer that is far simpler than Kaplan's Replace finite-state transducer, a $\lambda$-present finite-state transducer $l_1$, and a $\lambda$-absent finite-state transducer $l_2$.

In particular, the construction of the Replace finite-state transducer is straightforward, and the construction of the other finite-state transducers, r, f, $l_1$ and $l_2$, requires only the determinization of three automata and additional work that is linear, in both time and space, in the size of the determinized automata.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein:

FIG. 1 shows the finite-state transducers of Kaplan's system for an obligatory right-left context-dependent rewrite rule;

FIG. 3A shows the general form of the finite-state transducers, r, f, Replace, $l_1$ and $l_2$ of this invention;

FIG. 3B shows the general form of finite-state transducers r, f, $l_1$ and $l_2$ using the reverse and Marker operations;

DETAILED DESCRIPTION OF PREFERRED EMBODIMENTS

Figure 2A:
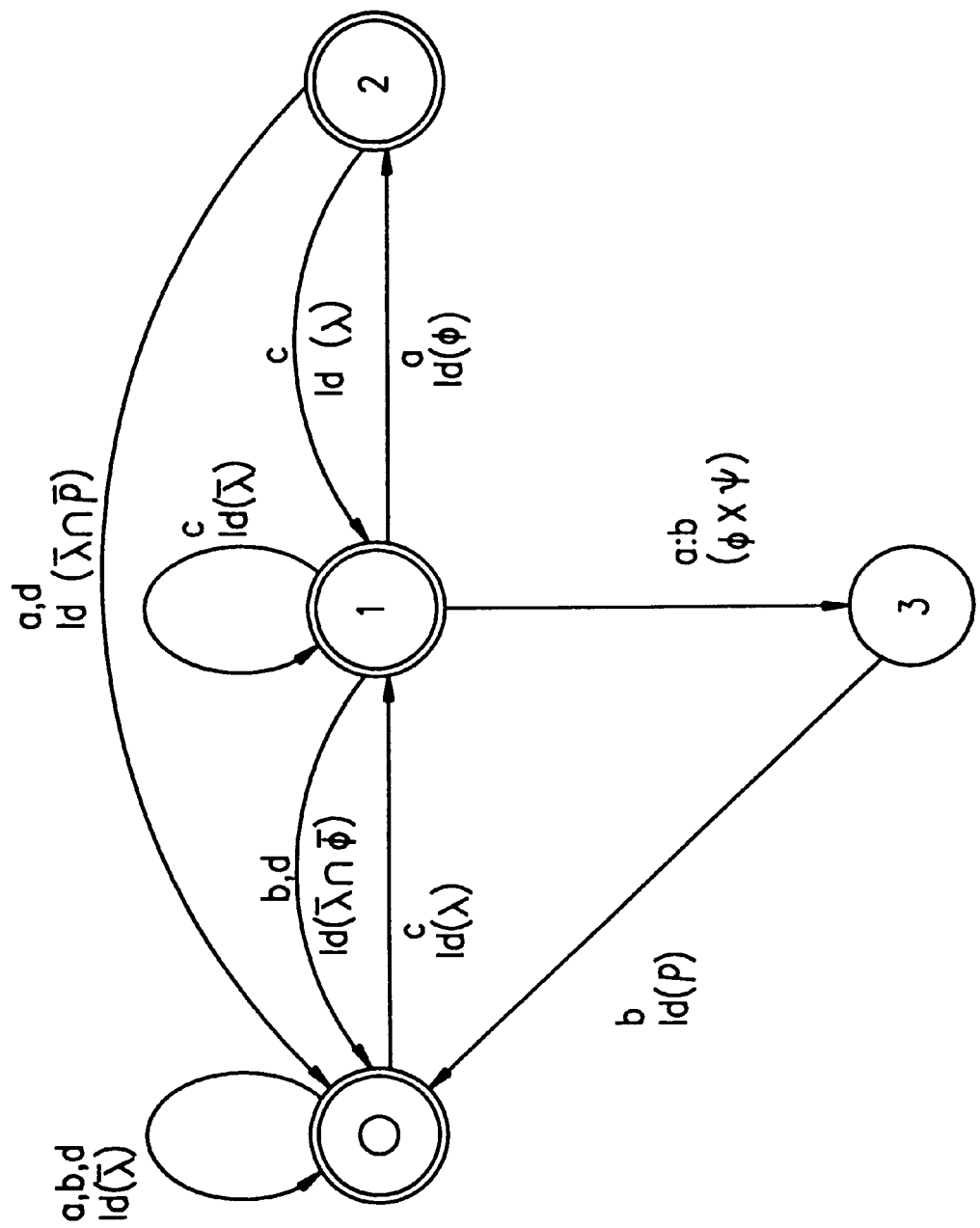
FIG. 2A shows the basic finite-state transducer for the rule "a→b/c__b"

One method for rewriting an input string to an output string using context-dependent rewrite rules is to convert the input string to be input to each of the rewrite rules into finite-state transducer operable over an alphabet of symbols contained in the input and output strings, given the conditions outlined above.

For example, in a text-to-speech generating system, a system which inputs a string of letters of the English written alphabet can rewrite it as an output string of symbols of the English pronunciation alphabet by converting the input string to a finite-state transducer. The system then converts each of the rewrite rules rewriting written English into pronunciation English to a finite-state transducer. The system then composes the input finite-state transducer with the union of the rule finite-state transducers. A projection of the output string, which will also be a finite-state transducer, can then be applied to a system which converts the symbols of the English pronunciation alphabet into electrical signals such that, when the projected output string in the English pronunciation alphabet is input to this downstream system, an electrical signal is output. This electrical signal, when applied to a speaker, generates correctly pronounced spoken English.

Similarly, in a speech recognition system, an electrical signal generated by a person speaking into a microphone is input into an acoustic model which outputs strings of symbols in an alphabet of phonemes of the language assumed to be spoken by the person. This input string of phoneme symbols is then converted to a finite-state transducer and composed with a union of the finite-state transducers generated from context-dependent rewrite rules that rewrite the phoneme symbols into text symbols. The output of this composition is a finite-state transducer of letters of the written language assumed to be spoken by the person. This finite-state transducer is then projected to generate the output string of letters of the written alphabet.

As pointed out in Kaplan, the representation of rewrite rules by finite-state transducers involves many subtleties. Time and space efficiency of the compilation are also crucial as naive methods for converting rewrite rules into finite-state transducers can be very time consuming and lead to very large machines.

This invention sets forth a system which converts context-dependent rewrite rules into finite-state transducers which is conceptually simple to understand and implement, and which is computationally efficient. The following discussion of the system for converting a context-dependent rewrite rule into a finite-state transducer and composing it with an input string will be made in reference to a left-right obligatory context-dependent rewrite rule. However, it should be appreciated that those skilled in the art will be able to easily modify the system disclosed herein to operate on left-right optional context-dependent rewrite rules, right-left obligatory and optional context-dependent rewrite rules and simultaneous obligatory and optional rewrite rules.

As shown in FIG. 3A, the system and method of this invention for converting left-right obligatory context-dependent rewrite rules includes five finite-state transducers: r, f, Replace, $l_1$ and $l_2$. The r finite-state transducer, or ρ-marking finite-state transducer, introduces a right marker > in an input string before every occurrence of the right context ρ in the input string. The f, or φ-marking, finite-state transducer introduces left markers $<_1$ and $<_2$ before each occurrence of φ that is followed by > in the input string. In other words, the f finite-state transducer marks just those occurrences of the rewrite portions φ of the input string that occur before occurrences of the right context ρ.

The Replace finite-state transducer replaces occurrences of the rewrite portion φ of the input string with the replacement portion ψ for each occurrence of the string "$<_1$φ>" that occurs in the input string. At the same time, the Replace finite-state transducer deletes all >'s in the input string. It should be appreciated that, because $<_1$, $<_2$ and > need to be ignored when determining when the rewrite portion φ of the input string occurs in the input string, there are loops over the transitions ">:ε", "$<_1$:ε" and "$<_2$:ε" at all states within φ. This is equivalent to loops over these transitions of the states of the cross-product finite-state transducer φxψ.

The $l_1$, or λ-present, finite-state transducer admits only those strings in which occurrences of $<_1$ are preceded by occurrences of λ. The $l_1$ finite-state transducer deletes $<_1$ at such occurrences.

The $l_2$, or λ-absent, finite-state transducer admits only those strings in which occurrences of $<_2$ are not preceded by occurrences of λ. The $l_2$ finite-state transducer deletes $<_2$ at such occurrences. The above-outlined descriptions of the r, f, Replace, $l_1$ and $l_2$ finite-state transducers are shown in FIG. 3A with the undefined right and left context portions ρ and λ, the rewrite portion φ and the replacement portion ψ.

FIG. 3B shows the r, f, $l_1$ and $l_2$ finite-state transducers rewritten in a form that is composable with a finite-state transducer τ generated from an input string ρ. That is, for any context-dependent rewrite rule P, the output finite-state transducer τ' is:

$$\tau' = \tau \circ r \circ f \circ \text{Replace} \circ l_1 \circ l_2$$

Furthermore, for a system that includes a number of context-dependent rewrite rules $P_1, P_2, \ldots, P_n$, the output finite-state transducer τ' is:

$$\tau' = \tau \circ (P_1 \cup P_2 \cup \ldots \cup P_n)$$

The result of applying the rewrite rules $P_1 \ldots P_n$ to the input string is the obtained by projecting the transducer τ' on the output side. Project (τ') is the automaton obtained from τ' by omitting the input labels of τ'. As mentioned above, FIG. 3B shows the forms of the r, f, $l_1$ and $l_2$ finite-state transducers which can be applied to a finite-state transducer τ. In particular, the r and f finite-state transducers are formed using a type 1 Marker finite-state transducer. The $l_1$ finite-state transducer is formed using a type 2 Marker finite-state transducer. The $l_2$ finite-state transducer is formed using a type 3 Marker finite-state transducer. As shown in FIG. 3B, the Marker finite-state transducers are represented as "Marker (prefix, type, insertion, deletion)". The effect the type 1–3 Marker finite-state transducers have when composed with an input finite-state transducer is shown in FIGS. 4A–4D.

Figure 4A:
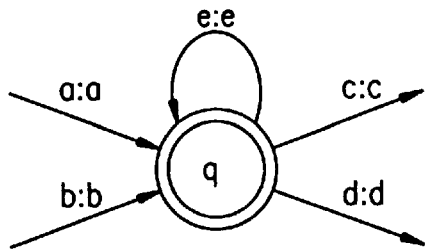
FIG. 4A shows an arbitrary state q of a finite-state transducer having input transitions a and b and output transitions c and d.

FIG. 4A shows an arbitrary final state q of an undefined finite-state transducer having input transitions "a" and "b", output transitions "c" and "d", and looping transition "e". The type 1 Marker finite-state transducer of the form "Marker (β, 1, {#}, Ø)" inserts a marker, in this case "#", and deletes all occurrences of the deletion string, in this case, no string, after all prefixes of a string that match a particular regular expression, in this case "β". Thus, in an arbitrary finite-state transducer τ, when the type 1 finite-state transducer Marker (β, 1, {#}, Ø) is applied to τ, all non-final states of τ are made final.

Next, for any final state q, a new state q', which is a copy of q, is inserted into τ. In particular, any loops of state q are both copied to q' and are copied as a loop extending from q' to q. This occurs because the copy process creates new transitions for each transition entering q from any source, including itself, and for each transition leaving q. Because loops both enter and leave q, two new transitions are created: the one leaving q' to q and the one entering q' from q'.

Figure 4B:
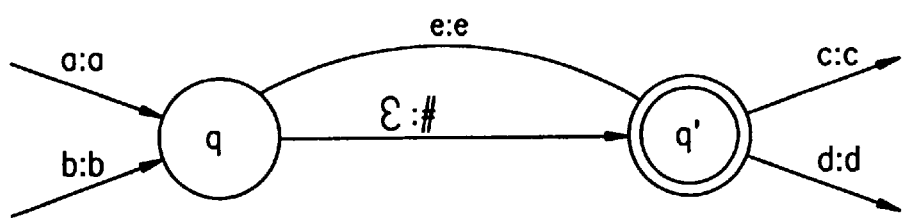
FIG. 4B shows the application of the type 1 Marker operation to state q shown in FIG. 4A.

Then, q is made non-final. Next, any transitions leaving q and any transitions entering q' are deleted. Thus, the "e" loop and the "c" and "d" transitions are deleted from q, while the "e" loop and the "a" and "b" transitions are deleted from q'. Finally, a new transition from q to q' is added having an input label ε and output label #. FIGS. 4A and 4B illustrate the transformation of the state q in τ.

Figure 4C:
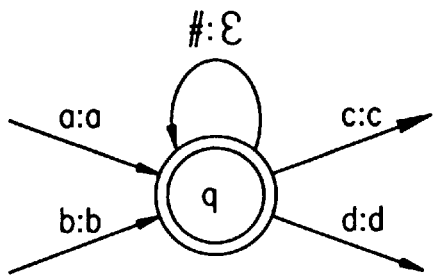
FIG. 4C shows the application of the type 2 Marker operation to state q of FIG. 4A.

The type 2 Marker finite-state transducer is used to check whether an occurrence of # in an arbitrary finite-state transducer is preceded (or followed) by an occurrence of β, where β is a regular expression defined on the alphabet of τ. In particular, type 2 Marker finite-state transducers play the role of a filter, in that they remove the deletion set. Thus, type 2 Marker finite-state transducers have the form "Marker (β, 2, Ø, {#})". For an arbitrary finite-state transducer τ having the state q shown in FIG. 4A, when a type 2 Marker finite-state transducer having the form "Marker (β, 2, Ø, {#})" is applied to τ, the "#" should only appear at final states, and must be erased. Thus, the transition "#:ε" is added to the final states of τ to accomplish this. All other states of the finite-state transducer τ are then made final, as any string conforming to this restriction is acceptable. This is shown in FIG. 4C, where the final state q now includes a new transition leaving q and returning to q and labeled "#:ε". To more clearly show the conversion of the state shown in FIG. 4A to the state shown in FIG. 4C, the "e" transition of FIG. 4A is not shown.

Figure 4D:
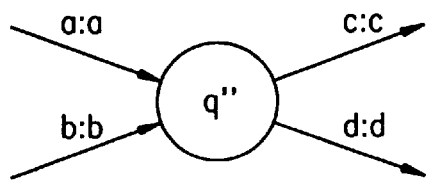
FIG. 4D shows an arbitrary non-final state q' of an arbitrary finite-state transducer having input transitions a and b and output transitions c and d.

Finally, the type 3 Marker finite-state transducer checks for the reverse constraint, that is whether an occurrence of "#" in the finite-state transducer τ is not preceded (or followed) by any occurrence of "β". Thus, for an arbitrary finite-state transducer τ having a state q", as shown in FIG. 4D, when a type 3 Marker finite-state transducer of the form "Marker (β, 3, Ø, {#})" is applied to τ, a loop labeled "#:ε"

is added to each non-final state and all states are made final. Thus, the non-final state q" shown in FIG. 4D is converted to the final state q shown in FIG. 4C by the type 3 Marker finite-state transducer.

FIGS. 5A–5G show the application of the type 1 Markers shown in FIG. 3B used in the r and f finite-state transducers, the type 2 Marker finite-state transducer used in the $l_1$ finite-state transducer and the type 3 Marker finite-state transducer used in the $l_2$ finite-state transducer. In particular, FIGS. 5A–5H correspond to the context-dependent rewrite rule "a→b/c__b", where "a", "b", and "c", are single or multiple symbol strings of the alphabet Σ, and "d" represents any single symbol or string of symbols of the alphabet Σ other than the strings "a", "b" and "c".

Figure 5A:
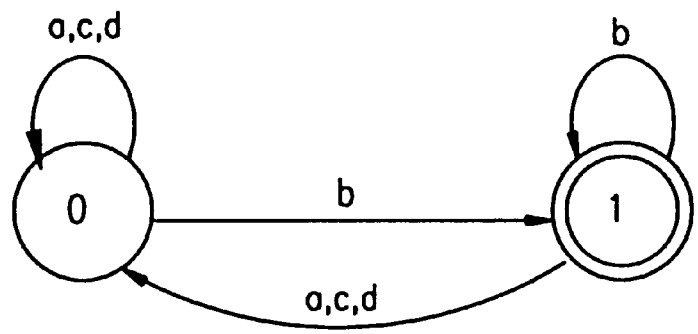
FIG. 5A is a minimal deterministic finite-state transducer for reverse($\rho$) when $\rho=\{b\}$ and $\Sigma=\{a,b,c,d\}$.

Thus, FIG. 5A represents the finite-state transducer Σ*reverse(ρ), where ρ="b". If the context-dependent rewrite rule "a→b/c__b" is an obligatory left-right rewrite rule, then the type 1 Marker finite-state transducer "Marker (prefix, type, insertion, deletion)", which inserts the insertion after occurrences of the prefix, will insert a ">" in front of "b" only if the finite-state transducer τ formed from the string σ is traversed in the reverse direction.

FIG. 5A thus shows a finite-state transducer which starts in start state 0 and maintains state 0 until the right context "b" is found. At that point, the finite-state transducer transitions to the final state 1. The finite-state transducer is maintained in state 1 as long as the right context "b" continues to appear in the input string. Otherwise, the finite-state transducer transitions back to state 0 from state 1.

Figure 5B:
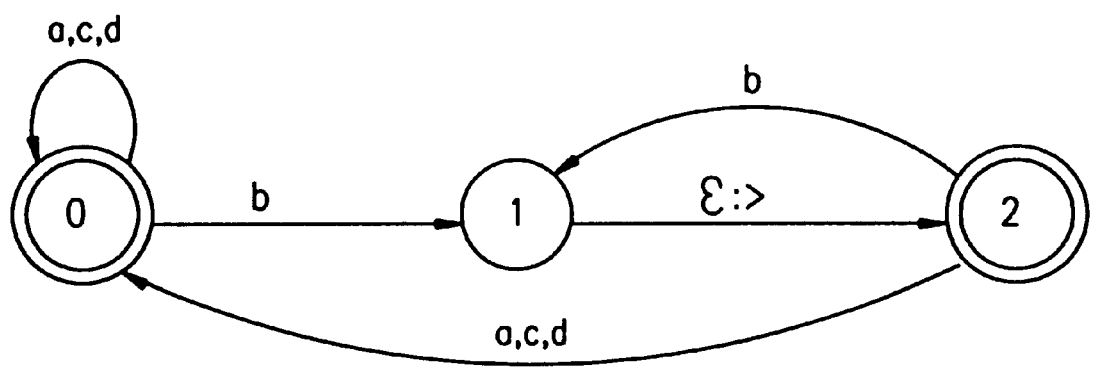
FIG. 5B is the resulting finite-state transducer after applying the type 1 Marker operation for the right marker ">" to the finite-state transducer of FIG. 5A.

Applying the type 1 Marker finite-state transducer "Marker (Σ* (b), 1, {>}, {#})" to the finite-state transducer shown in FIG. 5A results in the finite-state transducer shown in FIG. 5B. In particular, as shown in FIG. 5B, state 1 of FIG. 5A is copied as a new state 2, state 1 is made non-final, and the "a, c, d" transition from state 1 to state 0 is eliminated. Then, the "b" transition from state 0 to state 1 is deleted from state 2 and the "b" transitions looping at states 1 and 2 are deleted, leaving the "b" transition extending from state 2 back to state 1. Finally, state 0 is made final. The r finite-state transducer is then completed by forming the reverse finite-state transducer of the finite-state transducer shown in FIG. 5B.

Figure 5C:
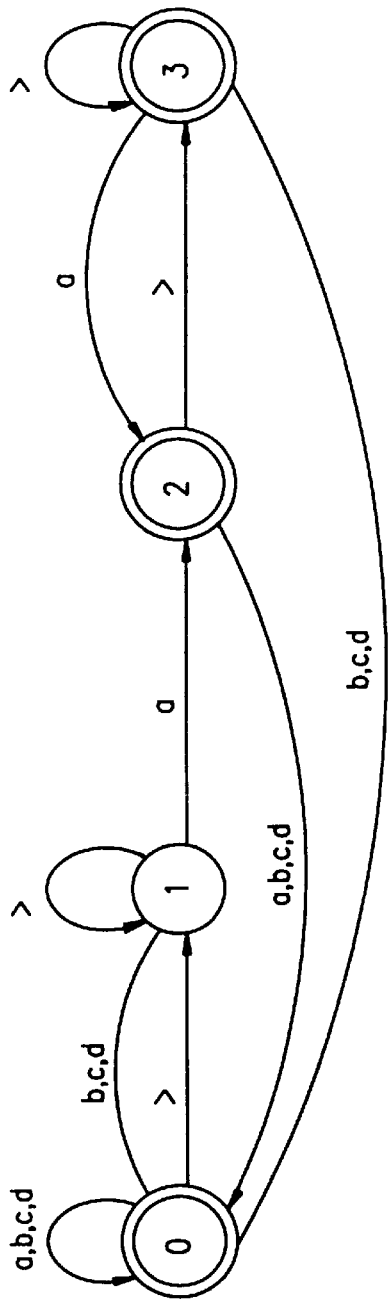
FIG. 5C is the minimal deterministic finite-state transducer for reverse($\phi_>$) when $\phi=\{a\}$ and $\Sigma^*=\{a,b,c,d,*>\}$.

FIG. 5C represents the finite-state transducer (Σ∪{>})* ($\phi_>$). In particular, this means that the alphabet for FIG. 5C now includes the symbol ">" as well. In addition, the symbol "$\phi_>$" indicates that φ could be a string of alphabet symbols rather than a single alphabet symbol, in that in an actual input string to which the r finite-state transducer has been composed may have >'s anywhere within the φ string. If these intervening >'s are not ignored, φ will not be properly identified. In addition, reverse ($\phi_>$) does not identify all occurrences of φ, but only those which are followed by a ">". The reverse operator is used so that the symbols to be inserted by the f finite-state transducer, $<_1$ and $<_2$, will be inserted before the φ string in the forward direction.

Thus, FIG. 5C shows a finite-state transducer which starts in non-final state 0 and maintains state 0 until a ">" is found. At that point, the finite-state transducer transitions to non-final state 1. The finite-state transducer is maintained in state 1 as long as the next symbol is another >. If the next symbol is "b", "c" or "d", the finite-state transducer returns to state 0. Otherwise, if the next input symbol is "a", the finite-state transducer transitions to final state 2.

More generally, the finite-state transducer will leave state 1 and begin moving toward state 2 as long as the next symbol is the first symbol in "$\phi_>$" when φ is a multi-symbol string. In this case, there will be additional intermediate states between state 1 and state 2 representing each of the other symbols of the multi-symbol φ. In addition, each of these symbols will have a transition which returns the finite-state transducer to that state. This implements the ability of the finite-state transducer to ignore intervening >'s.

Then, at state 2, the finite-state transducer will return to state 0 when the next symbol is "a", "b", "c" or "d". However, if the next symbol is a ">", the finite state transducer will continue to final state 3. This reflects that the "a", i.e., φ, may be followed by another occurrence of ">". In this case, the finite state transducer will return from state 3 to state 0 if the next symbol is "b", "c" or "d". If the next symbol is ">", the finite state transducer remains in state 3 for the same reasons it remains in state 1 when the next symbol is a ">". Finally, if the next symbol is "a", the finite state transducer returns to state 2, for the same reasons it continues from state 1 to state 2 when the next symbol is "a".

Figure 5D:
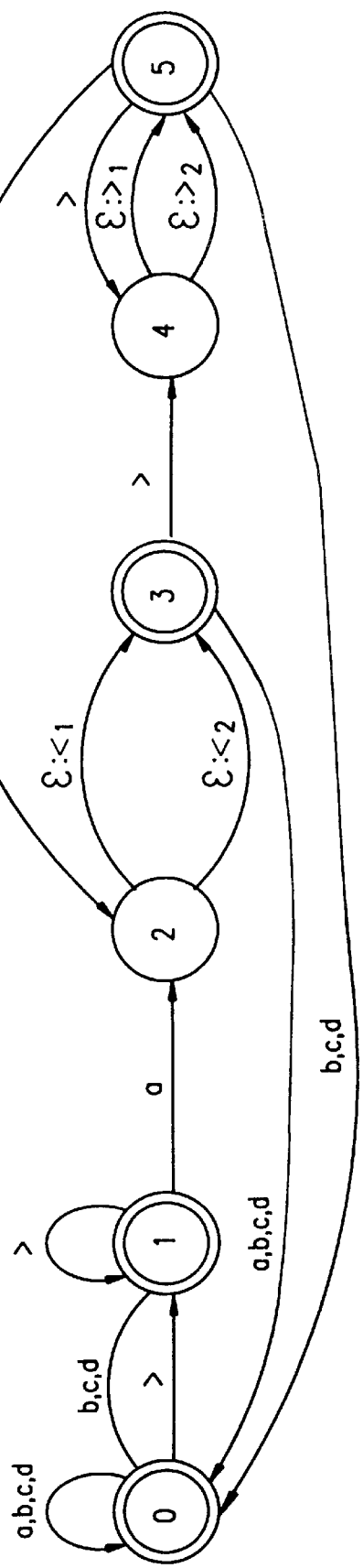
FIG. 5D is the resulting finite-state transducer after applying the type 1 Marker operation for the left markers "$<_1$" and "$<_2$" to the finite-state transducer of FIG. 5C.

Applying the type 1 Marker finite-state transducer "Marker(Σ∪{>})*reverse($\phi_>$>), 1,{$<_1$, $<_2$},∅))" to the finite-state transducer shown in FIG. 5C results in the finite-state transducer shown in FIG. 5D. In particular, as shown in FIG. 5D, state 3 of FIG. 5C is renumbered as state 4, old states 2 and 3 of FIG. 5C and their transitions are copied as new states 3 and 5, and states 2 and 4 are made non-final. Next, the output transitions from state 2 and the input transitions to state 3 are deleted. That is, the "a,b,c,d" transitions from state 2 to state 0 and the ">" transitions from state 2 to states 4 and 5 are eliminated. The copied "a" transitions from states 1, 4 and 5 to state 2 are also deleted from state 3. Next, the transitions "ε:$<_1$" and "ε:$<_2$" are added between states 2 and 3.

Then, the output transitions from state 4 and the input transitions to state 5 are deleted. That is, the "a" transition from state 4 to state 2 and the ">" transition looping at state 4 are eliminated. The ">" transitions extending from state 3 to state 5 and looping at state 5 are also eliminated. Next, the transitions "ε:$<_1$" and "ε:$<_2$" are added between states 4 and 5. Finally, states 0, 1, 3 and 5 are made final. The f finite-state transducer is then completed by forming the reverse finite-state transducer of the finite-state transducer shown in FIG. 5D.

Figure 5F:
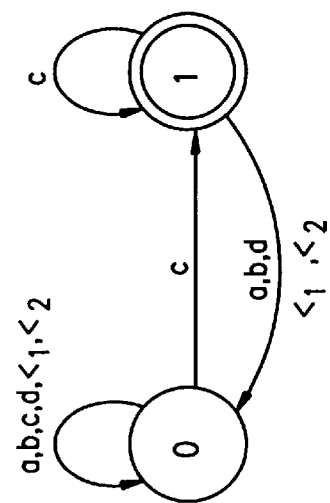
FIG. 5F is the basic deterministic finite-state transducer for $\lambda=\{c\}$ and $\Sigma=\{a,b,c,d,<_1,<_2\}$.
Figure 5E:
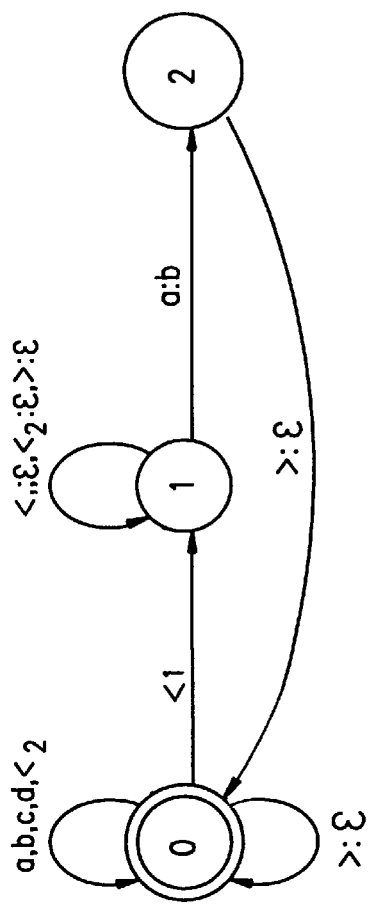
FIG. 5E is the replacement finite-state transducer Replace for the rewrite rule "a→b/c__b for $\Sigma=\{a,b,c,d,<_1,<_2,>\}$.

FIG. 5E shows the Replace finite-state transducer that replaces an input "a" with an output "b" when "a" is bracketed with $<_1$ and >, i.e., "$<_1$a>". In particular, the Replace finite-state transducer simultaneously deletes > in all positions. Additionally, because >, $<_1$ and $<_2$ need to be ignored when determining an occurrence of φ when φ is a multi-symbol string, there are loops in the Replace finite-state transducer and all states for the transitions ">:ε", "$<_1$:ε", and "$<_2$:ε" and all states of φ. This is equivalent to providing these transitions at the states of the cross product finite-state transducer "φxψ".

Thus, as shown in FIG. 5E, starting at final state 0, there is a transition from state 0 to state 0 for the symbols "a,b,c,d,$<_2$". There is a further transition looping at state 0 that inputs > and outputs ε, the null transition. That is, the Replace finite-state transducer is maintained in state 0 and does not change the output from the input unless > or $<_1$ are encountered. If > is encountered, a null transition is output, while if $<_1$ is encountered, the finite-state transducer transitions to non-final state 1. At state 1, the finite-state transducer is maintained in state 1 when $<_1$, $<_2$ or > are encountered. In each of these cases, the Replace finite-state transducer outputs a null transition. Once the finite-state transducer encounters "a", the symbol to be replaced, the finite-state transducer transitions to state 2 and outputs "b" in place of "a". Then, from state 2, the replace finite-state transducer returns to state 0 and deletes the trailing >.

FIG. 5F represents the finite-state transducer that identifies occurrences of the left context string $\lambda$. In addition, as $\lambda$ is only identified after the $<_1$ and $<_2$ are added, the alphabet $\Sigma^*$ for the rewrite rule "a→b/c__b" is "a,b,c,d,$<_1$, $<_2$". Thus, in the finite-state transducer shown in FIG. 5F, the finite-state transducer is maintained in the non-final start state 0 for all inputs except "c". At that point, the finite-state transducer of FIG. 5F transitions to final state 0. This finite-state transducer is maintained in state 1 as long as "c" is encountered. If any other symbol is input, the finite-state transducer returns from state 1 to state 0.

Figure 5G:
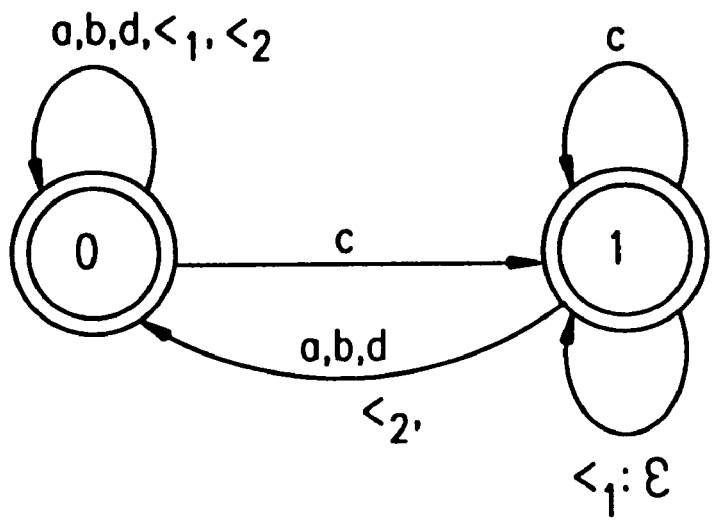
FIG. 5G is the resulting finite-state transducer after applying the type 2 Marker operation for the left marker $<_1$ to the finite-state transducer of FIG. 5F.

Applying the type 2 Marker finite-state transducer "Marker($\Sigma^*$c,2,∅,$\{<_1\}$)" to the finite-state transducer shown in FIG. 5F results in the finite-state transducer shown in FIG. 5G. In particular, as shown in FIG. 5G, a new transition is added to state 1 extending from and returning to state 1. This transition inputs $<_1$ and outputs the null transition. In addition, in the transition from state 1 to state 0, $<_1$ is removed. Finally, state 0 is made final to form the $l_1$ finite-state transducer.

Figure 5H:
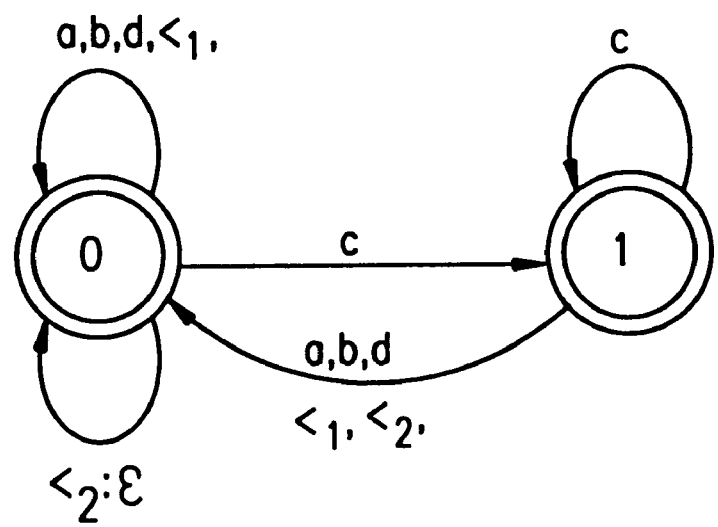
FIG. 5H is the resulting finite-state transducer after applying the type 3 Marker operation for the left marker $<_2$ to the finite-state transducer of FIG. 5F.

Similarly, applying the type 3 Marker finite-state transducer "Marker($\Sigma^*$c,3,∅,$\{<_2\}$)" to the finite-state transducer shown in FIG. 5F results in the finite-state transducer shown in FIG. 5H. In particular, as shown in FIG. 5H, a new transition is added to non-final start state 0. This transition extends from and returns to state 0 and inputs $<_2$ and outputs a null transition. Finally, state 0 is again made final to form the $l_2$ finite-state transducer.

Figure 6A:
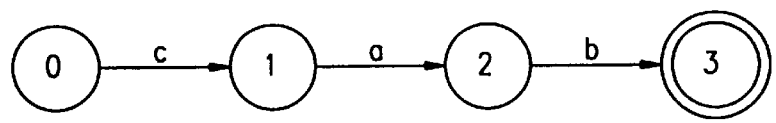
FIG. 6A shows a finite-state transducer $\tau$ generated from the input string "cab"

FIGS. 6A–6F show the conversion of the input string "cab" to the output string "cbb" by composing a finite-state transducer generated from the input string "cab" in order with the r, f, Replace, $l_1$ and $l_2$ finite-state transducers outlined above. Thus, FIG. 6A shows the finite-state transducer corresponding to the input string "cab".

Figure 6B:
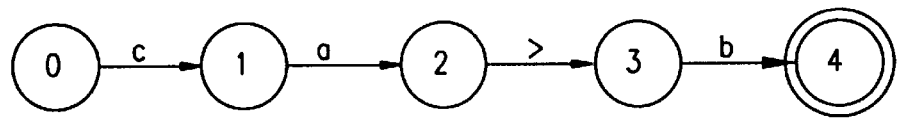
FIG. 6B shows the composition of $\tau$ and the r finite-state transducer.

Composing the r finite-state transducer with the input string finite-state transducer shown in FIG. 6A results in the finite-state transducer shown in FIG. 6B. In particular, since the right context ρ is "b", state 3 of the input finite-state transducer is renumbered as state 4 and a new non-final state 3 is inserted, as in FIG. 4B. The transition from state 2 is now labeled ">" and the transition from state 3 to state 4 is labeled "b".

Figure 6C:
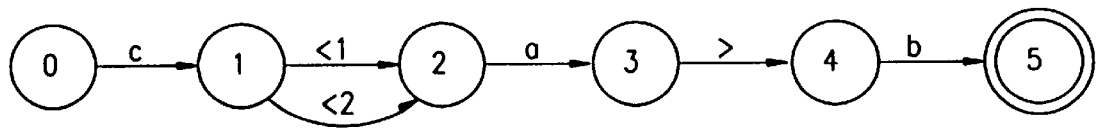
FIG. 6C shows the composition of the f finite-state transducer with the finite-state transducer of FIG. 6B.

Next, the finite-state transducer of FIG. 6B is composed with the f finite-state transducer to form the finite-state transducer of FIG. 6C. As shown in FIG. 6C, states 2, 3 and 4 of FIG. 6B are renumbered as states 3, 4 and 5, respectively. A new state 2 is inserted between states 1 and 3 in FIG. 6C, again as in FIG. 4B. Two new transitions from state 1 to state 2 are added for the $<_1$ and $<_2$ symbols. Finally, the "a" transition from state 1 to state 2 of FIG. 6B now extends between states 2 and 3 of FIG. 6C.

Then, the finite-state transducer of FIG. 6C is composed with the Replace finite-state transducer to form the finite-state transducer of FIG. 7D. In particular, two separate paths are formed extending form state 1. The first path represents the presence of the left context $\lambda$ and thus transitions to state 2 when the $<_1$ symbol is input. Because state 2 represents the presence of "a>", the transition from state 2 to state 3 is changed to "b" and the transition from state 3 to state 4, the ">" transition, is deleted such that state 2 transitions directly to state 4. At the same time, the second path from state 1 represents the absence of the left context $\lambda$. Thus, state 1 transitions to state 3 when the $<_2$ is input. Because this represents that the full context λφρ was not found, the transition from state 3 to state 4 remains labeled "a".

Figure 6D:
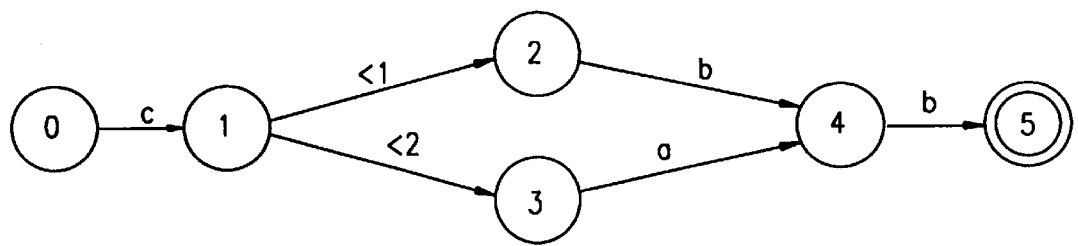
FIG. 6D shows the composition of the Replace finite-state transducer with the finite-state transducer of FIG. 6C.
Figure 6E:
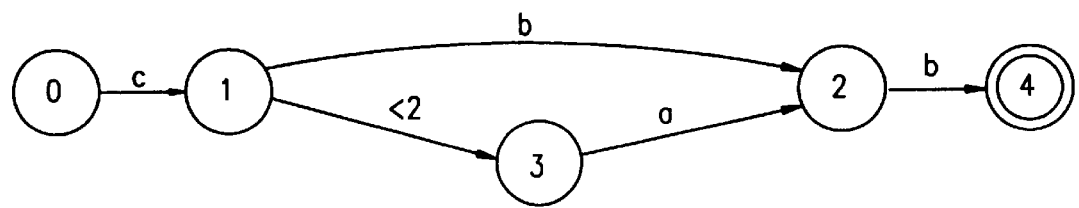
FIG. 6E shows the composition of the $l_1$ finite-state transducer with the finite-state transducer of FIG. 6D.

Next, the finite-state transducer shown in FIG. 6D is composed with the $l_1$ transducer, resulting in the finite-state transducer shown in FIG. 6E. In particular, as states 1 and 2 represent "λ$<_1$", the $<_1$ transition from state 1 to state 2 and state 2 are deleted, such that the "b" transition from state 2 to state 4 now extends directly from state 1. States 4 and 5 are thus renamed states 2 and 4. Because the transition from state 1 to state 3 requires the input of "$<_2$", this path is not traversed.

Figure 6F:
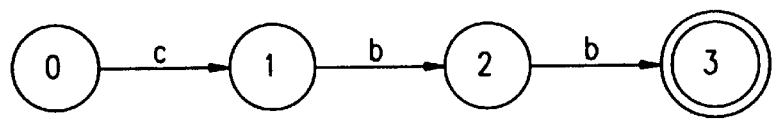
FIG. 6F shows the composition of the $l_2$ finite-state transducer with the transducer of FIG. 6E.

Finally, the finite-state transducer shown in FIG. 6E is composed with the $l_2$ transducer, resulting in the output finite-state transducer shown in FIG. 6F. In particular, because the left context $\lambda$, in this case "c", precedes the "$<_2$" transition from state 1 to state 3, the transition from state 2 through state 3 to state 4 is eliminated. The output string is then created by taking the projection of the output finite-state transducer shown in FIG. 6F, resulting in the output string "cbb".

Figure 2B:
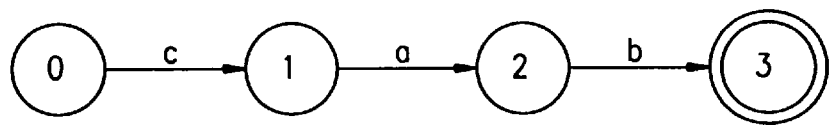
FIG. 2B shows a finite-state transducer for the input string "cab"
Figure 2C:
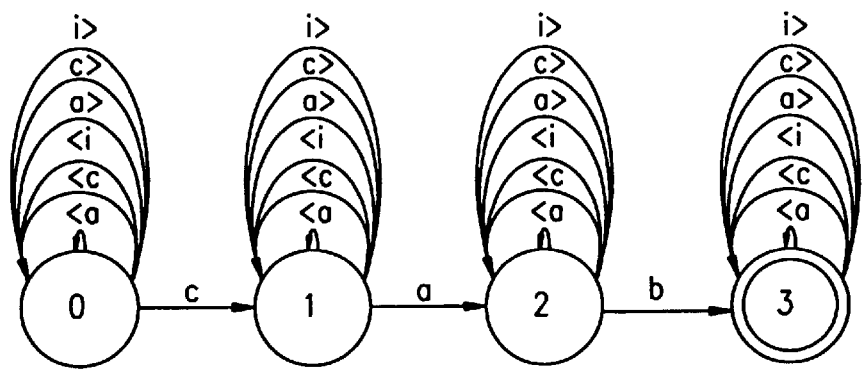
FIGS. 2C–2H show the intermediate finite-state transducers for the obligatory left-right rewrite rule "a→b/c__b" composed with the input finite-state transducer for the string "cab"
Figure 2D:
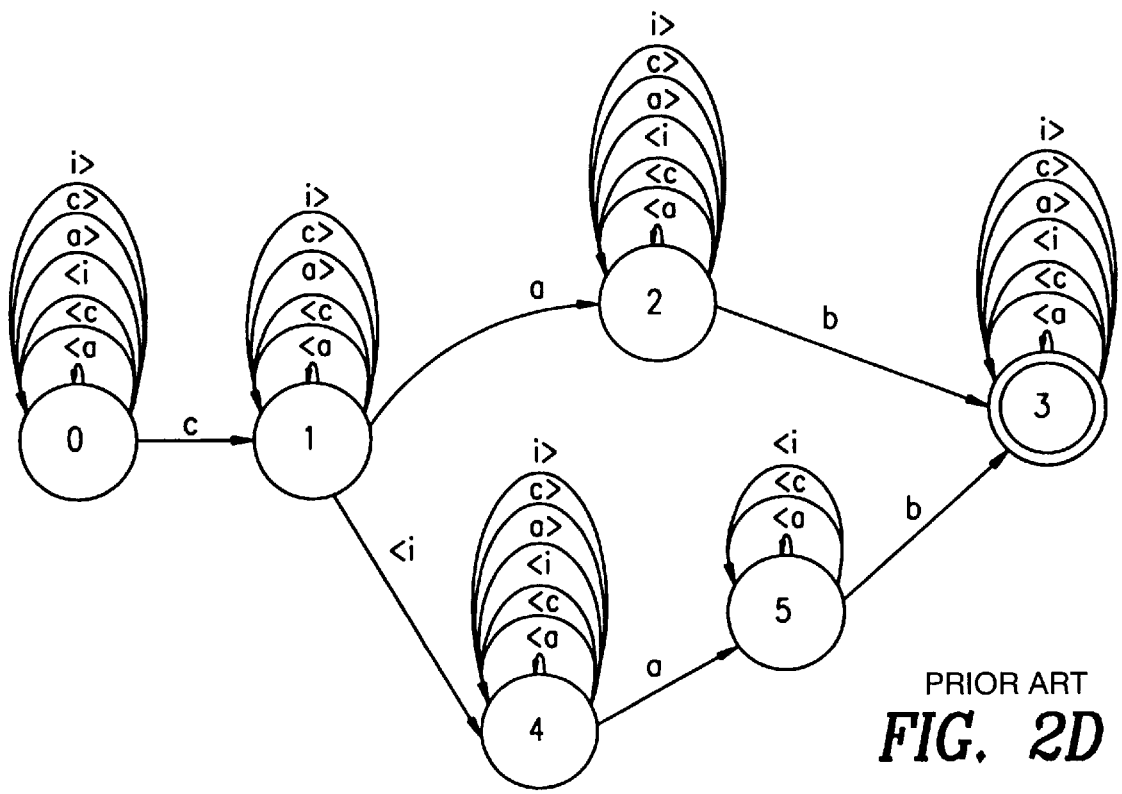
Figure 2E:
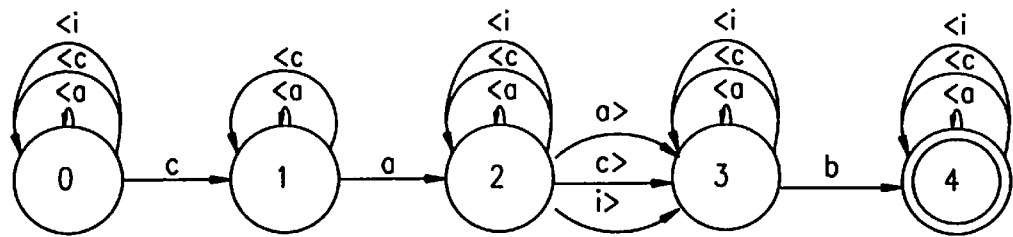
Figure 2F:
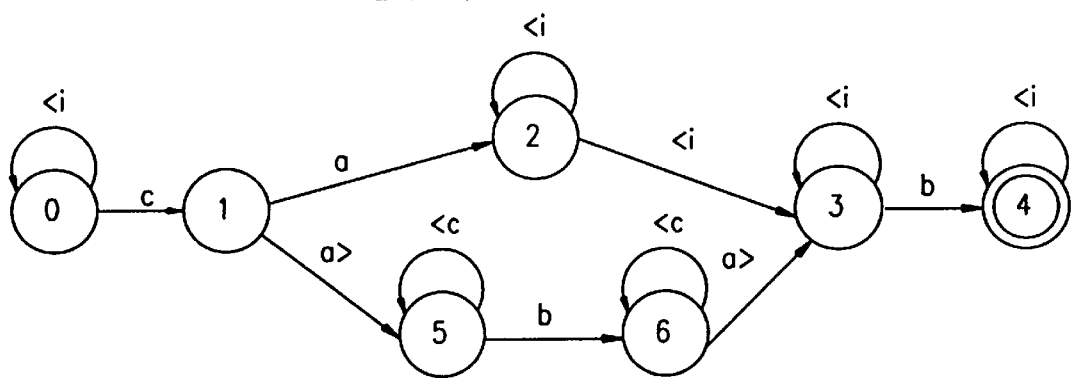
Figure 2G:
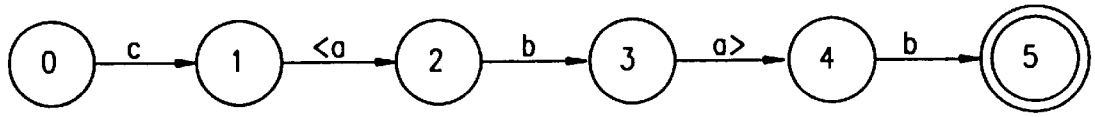
Figure 2H:
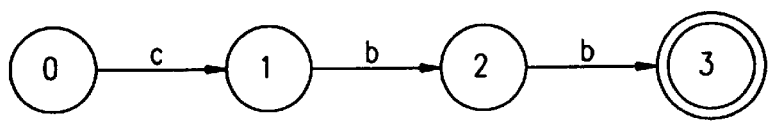
Figure 7:
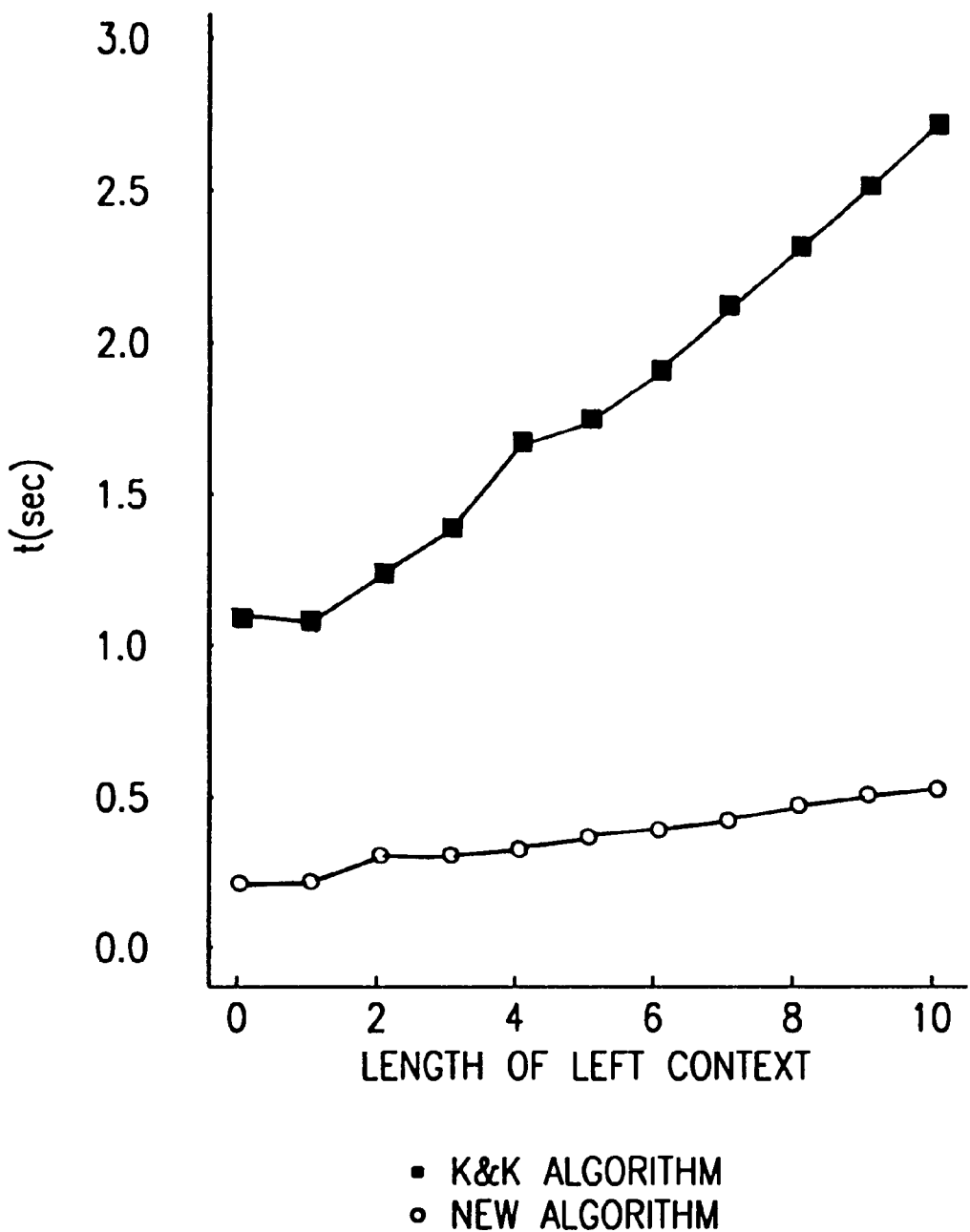
FIG. 7 shows a comparison of Kaplan's system and the system of this invention for the rule "a→b/$c^k$__"
Figure 8:
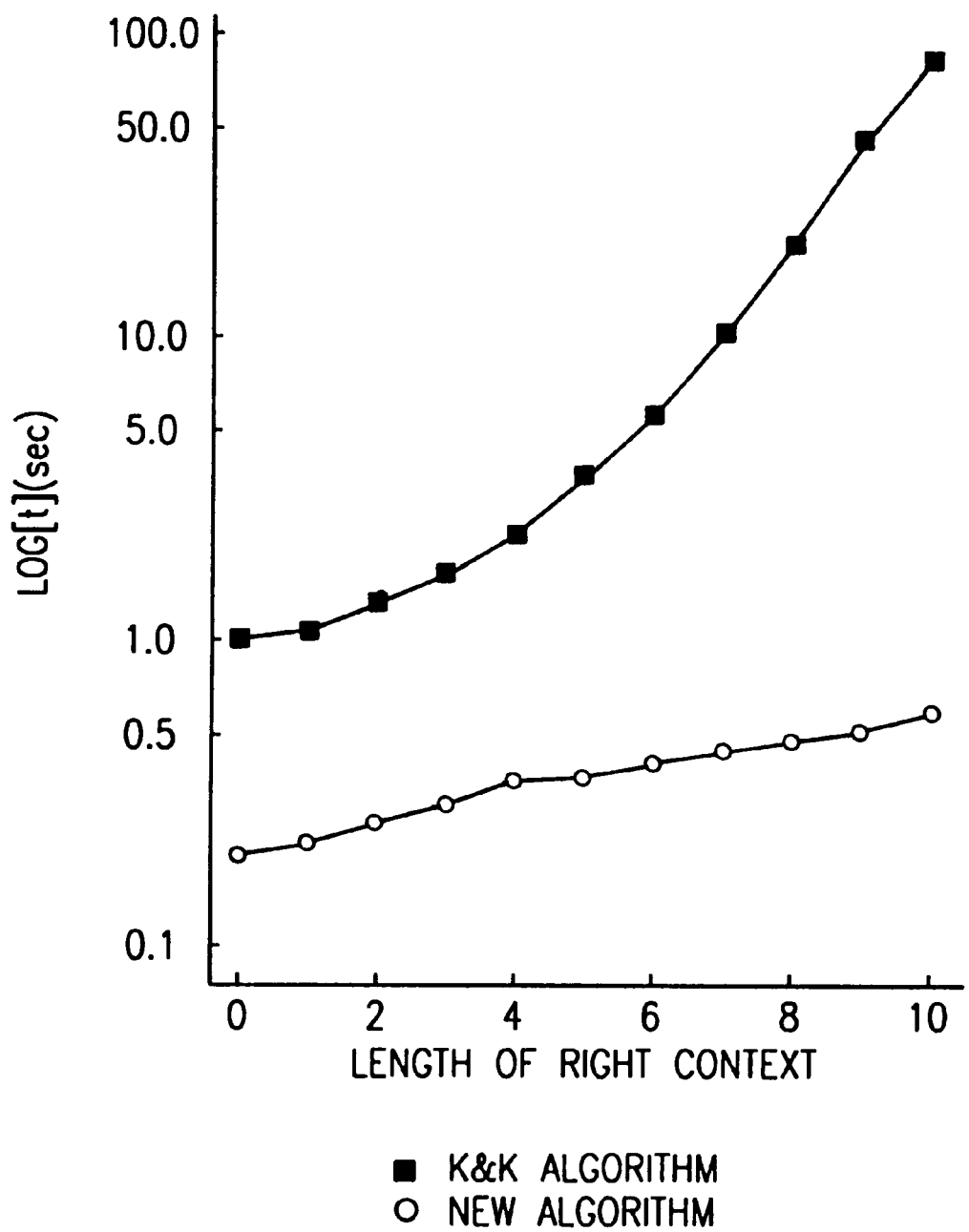
FIG. 8 shows a comparison of Kaplan's system and the system of this invention for the rule "a→b/__$c^k$"

Comparing the set of finite-state transducers generated when applying the Prologue transducer, the Id(Obligatory) transducer, the Id(Rightcontext) transducer, Kaplan's Replace transducer, the Id(Leftcontext) transducer and the Prolgue$^{-1}$ transducer to the input finite-state transducer shown in FIG. 2B with the r, f, Replace, $l_1$ and $l_2$ finite-state transducers of this invention, it is clear this invention results in a conceptually simpler and computationally more efficient device for composing context-dependent rewrite rules with input strings. FIGS. 7 and 8 highlight this computational efficiency.

In particular, FIG. 7 shows the comparison between Kaplan's system and the system of this invention for compiling rules of the form "a–b/$c^k$__" with input strings, where k ranges between 0 and 10, i.e., the rewrite rules "a→b/__", "a→b/c__", "a→b/cc__", etc. A shown in FIG. 7, even for "$c^{10}$", the compilation time for the system of this invention is at most approximately 0.5 seconds. In contrast, the compilation time for "$c^0$" for Kaplan's system is already greater than 1 second, and for "$c^{10}$", rises to more than 2.5 seconds.

FIG. 8 shows the compilation times for compiling input strings with context-dependent rewrite rules of the form "a→b/__$c^k$", where k is between 0 and 10, i.e., for the rewrite rules "a→b/__", "a→b/__c", "a→b/__cc", etc. One difference that should be appreciated immediately in FIG. 8, compared to with FIG. 7, is that the vertical axis of FIG. 8 is not in seconds, but is in log (seconds). As before, the compilation times for the system of this invention, even for "$c^{10}$", is at most 0.5 seconds. In contrast, in Kaplan's system, the compilation time is over 1 second for "$c^0$", and the compilation time is approximately 100 seconds for "$c^{10}$". Thus, not only is the system of this invention conceptually simpler, as shown by a comparison of FIGS. 2A–2H and 6A–6F, the system of this invention is computationally significantly more efficient, as shown in FIGS. 7 and 8.

In many applications, and, in particular, in areas related to speech, it is not simply sufficient to give all possible analyses of some arbitrary input. Rather, it is also necessary to generate some measure of how likely the analyses are. By considering extended regular expressions, namely, using the terminology of formal language theory, rational power series, the replacements can then be generalized.

The rational power series considered here are functions mapping $\Sigma^*$ to $R_+\cup\{\infty\}$, which can be described by regular expressions over the alphabet $(R_+\cup\{\infty\})$x$\Sigma$. An example of a rational power series is "S=(4a) (2b)*(3b)". It defines a function by associating a non-null number only with the strings recognized by the regular expression "ab*b". This number is obtained by adding the coefficients involved in the recognition of the string. The value associated with "abbb", for instance, is (S,abbb)=4+2+2+3=11.

In general, such extended regular expressions can be redundant. Some strings can be matched in different ways with distinct coefficients. The value associated with those strings will be the minimum of all possible results. For example, the rational power series "S'=(2a) (3b) (4b)+(5a) (3b*)" matches the regular expression "abb" with the different weights "2+3+4=9" and "5+3+3=11". The minimum of these two weights is the value associated with "(S',abb)= 9". Non-negative numbers in the definition of these power series are often interpreted as the negative logarithm of probabilities. By using the negative logarithm of probabilities, addition of the weights along this string recognition defines the total probability for each string. The string having the lowest sum is then selected as the string to be output, as this string has the highest probability.

Figure 9:
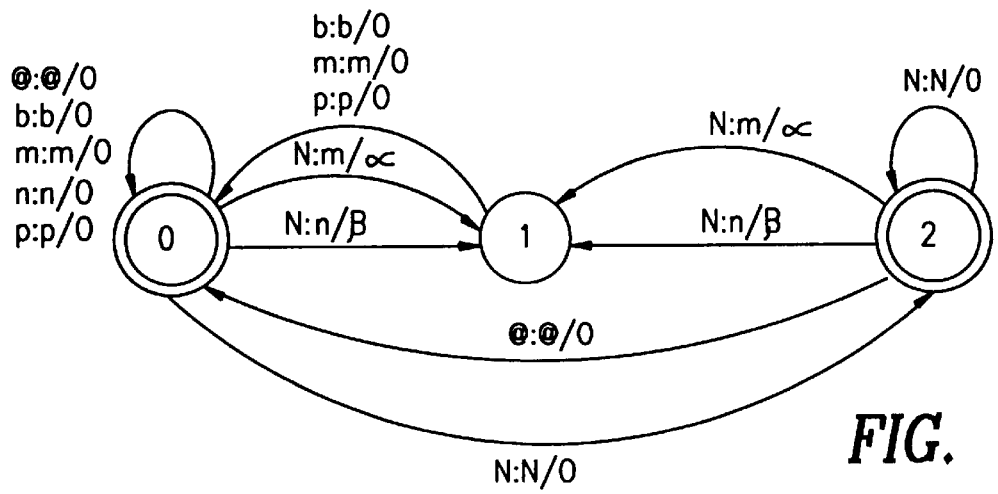
FIG. 9 shows a weighted finite-state transducer representing the rewrite rule "N→αm+βn/__[+labial]"

Rewrite rules can be generalized by letting ψ be a rational power series. The result of applying a generalized rule to a string is then a set of weighted strings, which can be represented by a weighted automaton. This is shown in FIG. 9, which shows the weighted finite-state transducer for the rule stating that an abstract nasal, denoted N, is rewritten as "m" when followed by a labial, such as "p", "b" or the like. That is, the context-dependent rewrite rule is:

N→αm+βn/_[+labial].

However, this rule may be only probabilistically true. Thus, while ninety percent of the time "N" is rewritten as "m" in this context, about ten percent of the time in real speech it becomes "n". Converting from probabilities to weights, "N" becomes "m" with weight "α=−log (0.9)", and becomes "n" with weight "β=−log (0.1)", in this context. This probabilistic rule of speech is then represented by the weighted context-dependent rewrite rule:

N→αm+βn/_[+labial].

This weighted context-dependent rewrite rule will then be converted to a weighted finite-state transducer, i.e., a transducer such as that shown in FIG. 9, so that each transition, in addition to input and output labels, has a weight which indicates the probability that that transition will be taken.

The result of applying a weighted finite-state transducer to a string, or more generally, to an automaton, is a weighted automaton. Applying a weighted finite-state transducer to a string is similar to applying an unweighted finite-state transducer to that string. However, the weights of the various transitions of the weighted finite-state transducer and the weights of the transitions of the string or automaton need to be combined as well during composition.

As described above, a context-dependent rewrite rule can be compiled into a finite-state transducer by composing the r, f, Replace, $l_1$ and $l_2$ finite-state transducers for that context-dependent rewrite rule. In addition, as outlined above, the r, f, $l_1$ and $l_2$ finite-state transducers are used merely to represent the right context, the regular expression to be replaced, and the left context, respectively. Thus, it is only the Replace finite-state transducer that is implicated when the replacement regular expression φ becomes a weighted replacement regular expression.

That is, only the Replace transducer needs to be modified when a particular context-dependent rewrite rule is modified into a weighted context-dependent rewrite rule. In particular, in the example outlined above in FIGS. 5A–5H, if the context-dependent rewrite rule "a→b/c_b" is replaced with the weighted context-dependent rewrite rule "a→.6b+.4c/ c_b", the r, f, $l_1$ and $l_2$ transducers will not change. Rather, the only change will be in the Replace transducer shown in FIG. 5E.

Furthermore, the only change in FIG. 5E will be replacing the transition from state 1 to state 2, presently labeled "a:b", with two transitions from state 1 to state 2. The first transition will be labeled "a:b/.6", while the second transition will be labeled "a:c/.4". Additionally, because all of the other transitions do not change, and have a 100% probability of occurring (i.e., a negative logarithm of probabilities of zero), each of the other transitions in FIG. 5E, namely, the loops at states 0 and 1, the transition from state 0 to state 1, and the transition from state 2 to state 0, will have their labels modified to label each transition with a "/0", indicating a negative logarithm of probabilities of zero, or a 100% chance of occurring.

Figure 10:
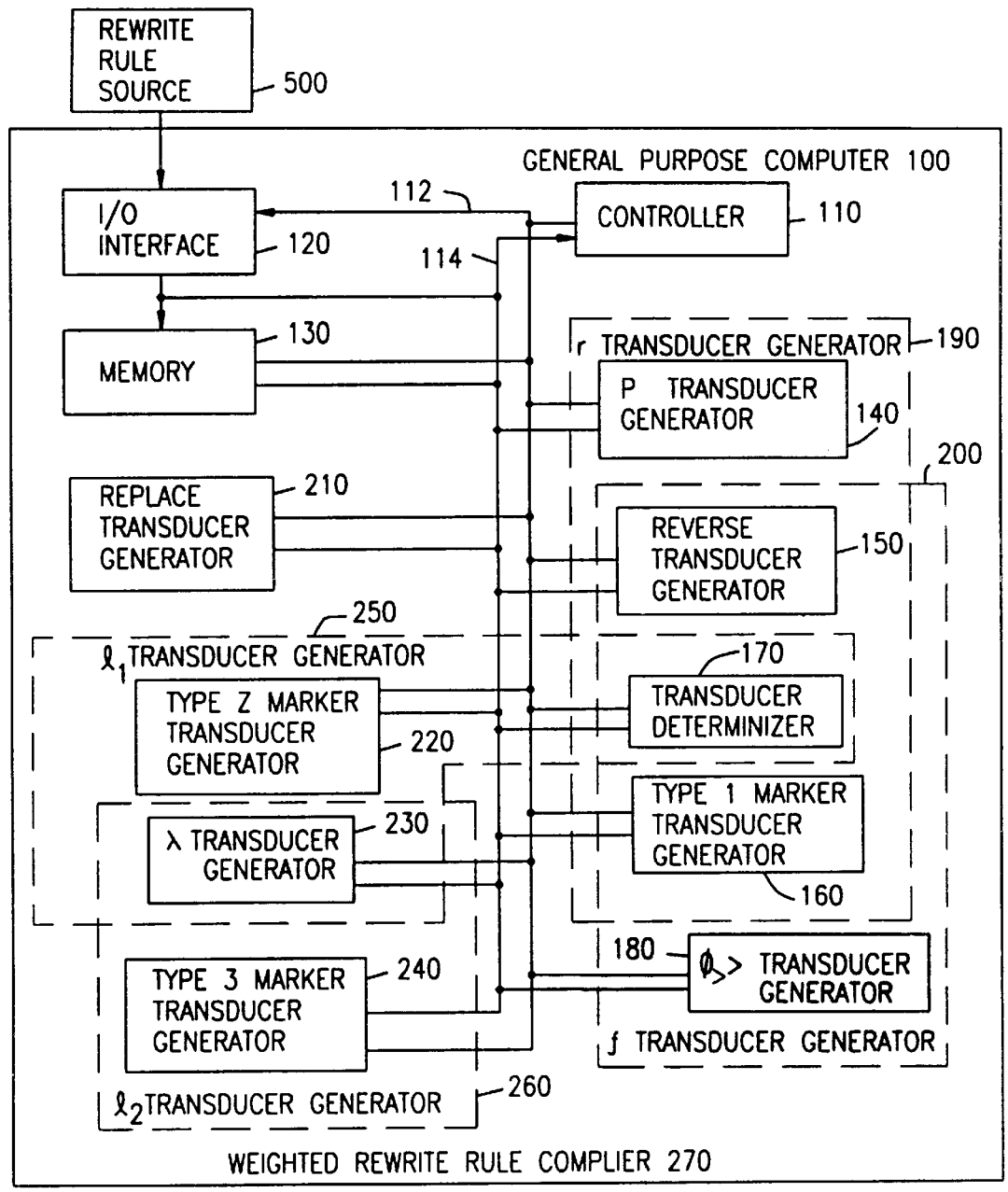
FIG. 10 shows a preferred embodiment of the functional organization of a general purpose computer implementing a weighted rewrite rule compiler.

FIG. 10 shows a preferred embodiment of the functional organization of a weighted rewrite rule compiler 270 implemented on a general purpose computer 100. In particular, the weighted rewrite rule compiler 270 inputs weighted rewrite rules from a rewrite rule source 500. The rewrite rule source 500 can be any source of rewrite rules. Furthermore, the rewrite rules can be rules which rewrite text into morphemes, morphemes into phonemes, phonemes into phonetic text, phonetic text into acoustic parameters, acoustic observations sequences into context-dependent phonetic sequences, context-independent phonetic representations to context-dependent representations, or the like. It should be appreciated that this is merely a representative list, and is not intended to be exhaustive.

Regardless of the actual strings being represented by the regular expressions in the rewrite rules, the rewrite rules are input from the rewrite rules source 500 into a memory 130 of the weighted rewrite rule compiler 270 via an I/O interface 120. In particular, the controller 110 is connected to the I/O interface 120 the memory 130 and the other elements of the weighted rewrite rule compiler 270 by a control bus 112 and a data bus 114. It should be appreciated that this description of the weighted rewrite rule compiler 270 is only functional. That is, a microprocessor based general purpose computer 100 actually implementing this weighted rewrite rule compiler 270 will not have a physical structure which corresponds to this description. Rather, it is the functional operation of the general purpose computer 100, when implementing the weighted rewrite compiler 270, that will correspond to this description.

Once the rewrite rules are input from the rewrite rule source 500 to the memory 130, a controller 110 sequentially reads one rewrite rule out of the memory 130 and converts it into a finite-state transducer using the methods outlined above. As each rewrite rule is read from the memory 130 by the controller 110, it is decomposed into its constituent right context portion ρ, left context portion λ, replaced portion φ, and replacement portion ψ. The right context portion ρ is output to an r transducer generator 190, while the replaced portion φ is output to an f transducer generator 200. The left context portion λ is output to an $l_1$ transducer generator 250 and an $l_2$ transducer generator 260. Finally, the replacement portion ψ is output to a replace transducer generator 210.

The r transducer generator 190 generates the r transducer, as described above with respect to FIGS. 5A and 5B, from the right context portion ρ. Accordingly, the right context portion ρ is first input to a ρ transducer generator 140 that generates a ρ transducer. This ρ transducer is then output to the reverse transducer generator 150, which outputs a "reverse(ρ)" transducer. This transducer is then output from the reverse transducer generator 150 to a type 1 marker transducer generator 160 that converts the "reverse(ρ)" transducer, such as that shown in FIG. 5A, to a "Marked (reverse(ρ))" transducer, such as that shown in FIG. 5B. In particular, the type 1 marker transducer generator 160, in generating the "Marked (reverse(ρ))" transducer, invokes the transducer determinizer 170 to generate a determinized "Marked(reverse (ρ))" transducer. The determinized "Marked(reverse(ρ))" transducer is again input to the reverse transducer generator 150, which outputs the r transducer.

Similarly, the f transducer generator 200 includes a $\phi_>$ transducer generator 180, which generates the "$\phi_>$" transducer. This "$\phi_>$" transducer is then output to the reverse transducer generator 150 to generate a "reverse($\phi_>$)" transducer, such as that shown in FIG. 5C. This "reverse ($\phi_>$)" transducer then again passes through the type 1 marker transducer generator 160 and the transducer determinizer 170 to generate a "Marked(reverse($\phi_>$))" transducer, such as that shown in FIG. 5D. This "Marked (reverse($\phi_>$))" transducer is then again put through the reverse transducer generator 150 to generate the f transducer.

The $\phi$ and $\psi$ portions of the rewrite rule are then input to the replace transducer generator 210 to generate the Replace transducer, such as that shown in FIG. 5E. Furthermore, if the rewrite rule being compiled is a weighted rewrite rule, it is generated as outlined above with respect to FIG. 9.

The left context portion $\lambda$ is output to a transducer generator 230, which generates a $\lambda$ transducer, such as that shown in FIG. 5F. The $\lambda$ transducer generator 230 forms part of both the $l_1$ transducer generator 250 and the $l_2$ transducer generator 260. The $\lambda$ transducer is then input to a type 2 marker transducer generator 220 of the $l_1$ transducer generator 250 and a type 3 marker transducer generator 240 of the $l_2$ transducer generator 260. Because the type 2 marker transducer generator 220 adds a loop, it also invokes the transducer determinizer 170. Thus, the $l_1$ transducer generator 250 generates the $l_1$ transducer, such as that shown in FIG. 5G. Similarly, the $l_2$ transducer generator 260 generates the $l_2$ transducer, such as that shown in FIG. 5H.

Each of the r, f, Replace, $l_1$ and $l_2$ transducers are stored in the memory 130 as they are generated. Once all the transducers are generated, they can be input from the memory 130 and composed by the controller 110. The composed transducer is then stored back in the memory 130 as the finite-state transducer corresponds to the compiled rewrite rule. Once all of the rewrite rules have been compiled (and optionally composed), the union of all of the composed (or sets of composable) finite-state transducers formed from the various rewrite rules is generated to form the complete transducer for a particular function, such as converting text into morphemes. This complete transducer can then be stored in the memory 130 or can be output to some other system, such as a text-to-speech synthesizer or an automatic speech recognition system.

Figure 11:
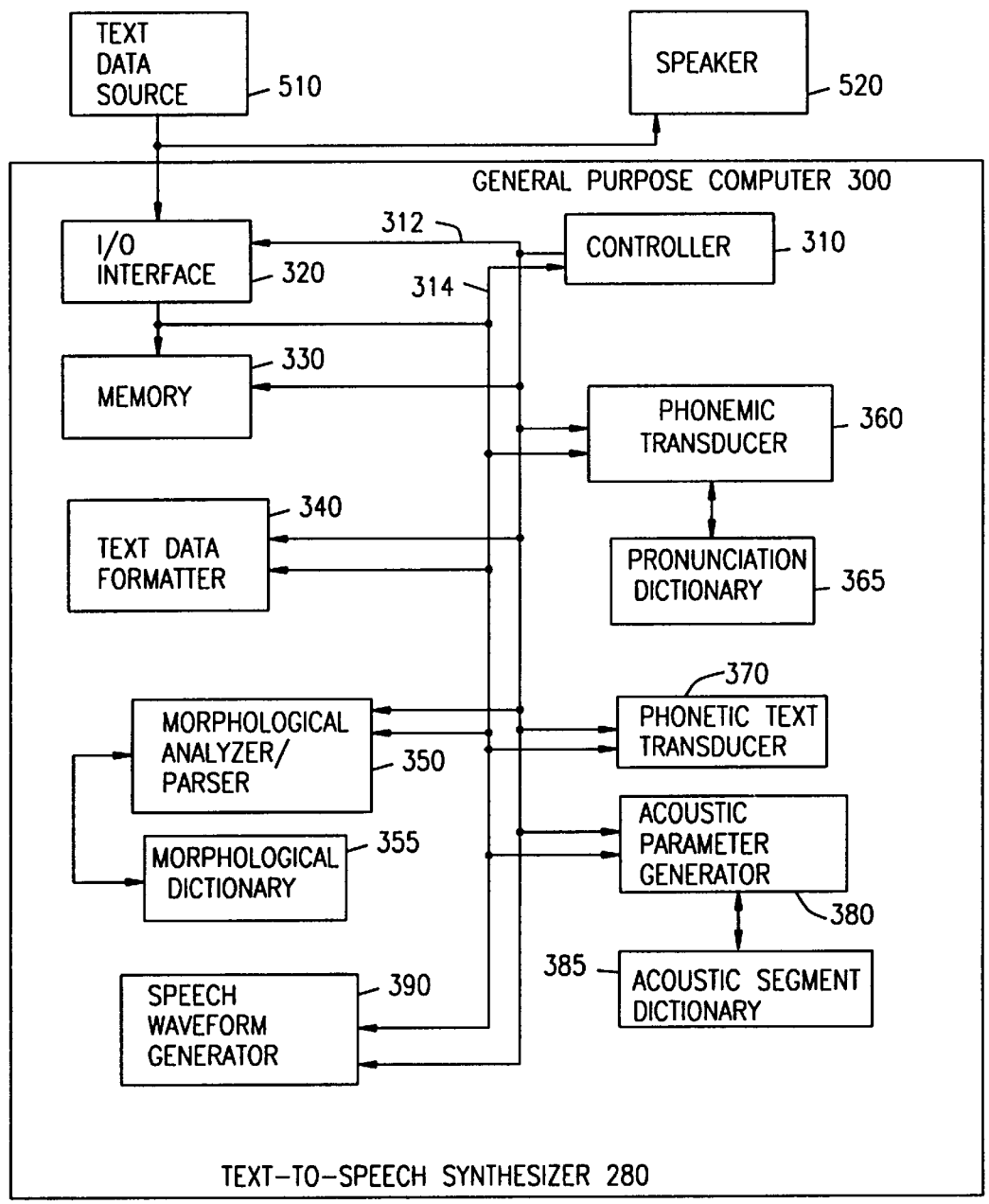
FIG. 11 shows a preferred embodiment of the functional structure of a general purpose computer implementing a text-to-speech synthesizer.

FIG. 11 shows one preferred embodiment of the functional organization of a text-to-speech synthesizer 280 implemented using a general purpose computer 300. In particular, a text data source 510 inputs a stream of electronic text data, such as ASCII data or the like. The text data source 510 can be a networked personal computer, minicomputer or mainframe computer networked to the general purpose computer 300, a remote computer connected to the general purpose computer via a modem and/or the Internet, or the like. The text data could be a document, an e-mail message, program code or the like. In particular, the electronic text data will be input from the text data source 510 via an I/O interface 320 into a memory 330. The text data will be read from the memory by a controller 310. The controller 310 communicates with the various elements of the text-to-speech synthesizer 280 via a control bus 312 and a data bus 314.

Once the text data is read from the memory 330 by the controller 310, it is output to a text data formatter 340. The text data formatter 340 converts any non-standard text, such as abbreviations, roman numerals, dates, times, formula, punctuation marks and the like, into a standard format so that the phonetic content of such non-standard text can be extracted.

The formatted text data is then output to a morphological analyzer/parser 350, which is implemented as a union of finite-state transducers compiled from weighted context-dependent rewrite rules. The morphological analyzer/parser 350 parses the formatted text into morphemes and adds morphological information, such as part of speech, gender, number, or the like. It should be appreciated that the morphological rules depend on the language assumed for the text data and are based on very large dictionaries. Thus, the morphological analyzer/parser implements a morphological dictionary 355.

The morphological parsed text is then converted into phonemic text using pronunciation rules. These pronunciation rules, including a pronunciation dictionary 365, are implemented by a phonemic transducer 360, which is a union of the finite-state transducers compiled from the various weighted context-dependent rewrite rules for the language of the text using the compiler of FIG. 10. These weighted context-dependent rewrite rules take into account the probability that a given input will be pronounced in different ways in cases where several possibilities exists. Typically, about 300 pronunciations rewrite rules are necessary to build the pronunciation system of rules of languages such as English, German or French. Because the time spent at the morphological analysis and the pronunciation state is crucial, the use of finite-state transducers makes these two processes extremely efficient, both in time and space, and allows the text-to-speech synthesizer 280 to operate in real time.

The phonemic text output by the phonemic transducer 360 is then input into a phonetic text transducer 370. The phonetic text transducer 370 is also implemented as a union of various finite-state transducers compiled from context-dependent rewrite rules. The phonetic text contains pitch and duration information. The phonetic text output by the phonetic text transducer 370 is input into an acoustic parameter generator 380. The acoustic parameter generator 380 uses an acoustic segment dictionary 385 to generate acoustic parameter from the phonetic text. The acoustic parameter vectors are then output to a speech waveform generator 390, which generates speech waveforms from the acoustic parameter vectors using multiphase LPC synthesis. The generated speech waveforms are then output via the I/O interface 320 to a speaker 520, which converts the speech waveforms into acoustic energy perceivable by a listener.

Figure 12:
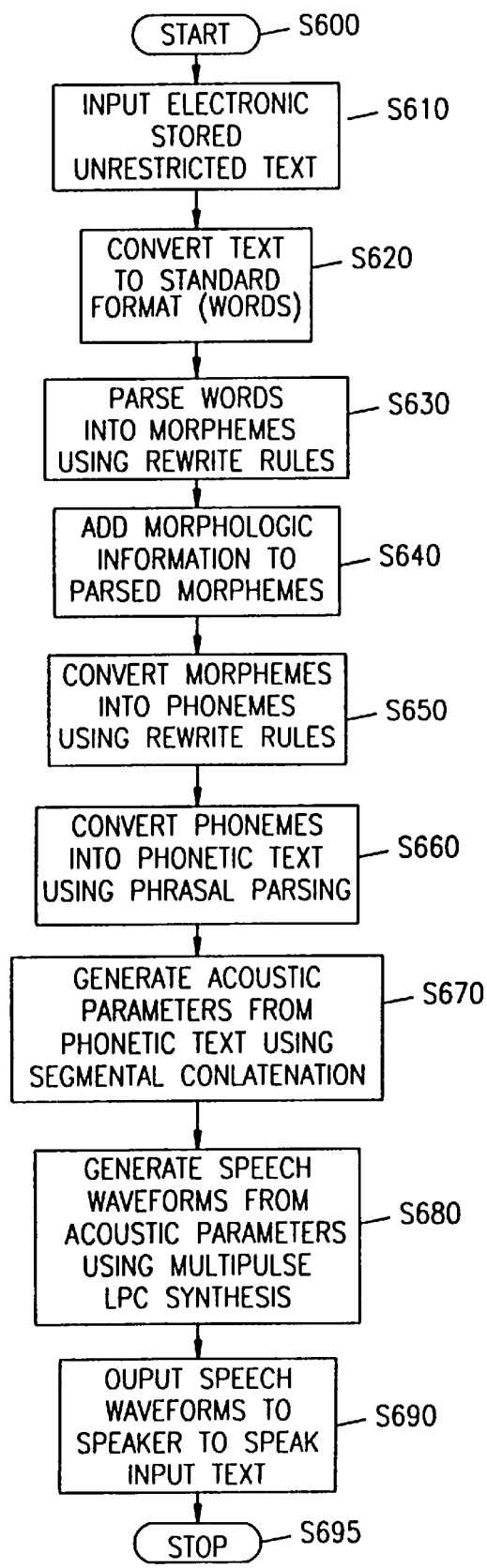
FIG. 12 shows a flow chart outlining a preferred method for converting text into speech using weighted rewrite rules compiled according to this invention.

FIG. 12 is a flow chart outlining this process. Starting in step S600, the method for generating speech from input text data using compiled weighted context-dependent rewrite rules continues to step S610, where the electronically stored unrestricted text data is input. Then, in step S620, the electronic text data is converted into standard format or words. For example, the punctuation ", " or ";" is converted into the text "comma" or "semi-colon".

Next, in step S630, the words are parsed into morphemes using finite-state transducers compiled from weighted context-dependent rewrite rules. Then, in step S640, morphological information is added to the parsed phonemes.

Next, in step S650, the morphemes are converted into phonemes, again using finite-state transducers compiled from weighted context-dependent rewrite rules. Then, in step S670, acoustic parameter vectors are generated from the finite text using segmental concatenation. Subsequently, in step S680 speech waveforms are generated from the acoustic parameter vectors using multiphase LPC synthesis. However, it should be appreciated that, in steps S670 and S680, the acoustic parameters and the speech waveforms can be generated by any known process.

Next, in step S690, the speech waveforms are output to a speaker to generate acoustic energy. That is, they are output to a speaker to generate spoken words from the input text. Finally, from step S690, control continues to step S695, where the process stops.

Figure 13A:
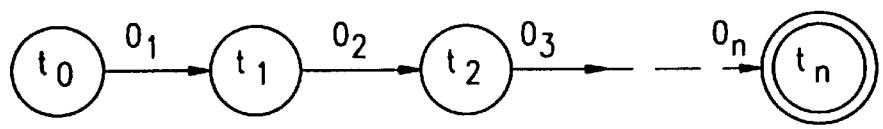
FIG. 13A shows a weighted acceptor O describing an acoustic observation sequence for an arbitrary utterance to be recognized.
Figure 13B:
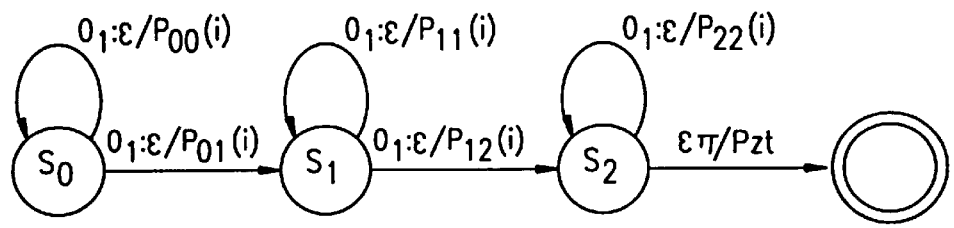
FIG. 13B shows a mapping finite-state transducer A mapping acoustic observation sequences to context-dependent phone sequences.

FIG. 13A–13D show a weighted acceptor O, a mapping finite-state transducer A, a conversion finite-state transducer C and a word sequence finite-state transducer D, respectively, that allow an automatic speech recognition system to be implemented. That is, transducer composition can be used to represent the combination of various levels of acoustic, phonetic, and linguistic information required by the recognition system. The recognition task can be decomposed into the weighted acceptor O, which describes the acoustic observation sequence for an utterance to be recognized. The recognition task is further decomposed into the mapping transducer A, which maps acoustic observation sequences to context-dependent phone sequences, the conversion transducer C, which converts between sequences of context-dependent and context-independent phonetic units, the word transducer D, which converts the context-independent units sequences into word sequences, and a weighted acceptor M, which specifies the language model, i.e., the likelihood of different lexical transcriptions The trivial acoustic observation acceptor O, as shown in FIG. 13A, represents the vector-quantized representation of a given utterance. Each state of the observation acceptor O represents a point in time $t_i$. Each transition from $t_{i-1}$ to $t_i$ is labeled with the name, $o_i$, of the quantization cell that contains the acoustic parameter vector for the sample time $(t_{i-1})$. For continuous-density acoustic representations, each transition from $(t_{i-1})$ to $(t_i)$ would be labeled with a distribution name and the likelihood of that distribution generating the acoustic parameter vector. Furthermore, there would be such a transition for each acoustic-parameter distribution in the acoustic model.

The mapping transducer A is built from weighted context-dependent phone models. A context-dependent phone model is a transducer that inputs a sequence of acoustic observation labels and outputs a specific context-dependent phonetic unit, while assigning to each acoustic sequence the likelihood that the specified context-dependent phonetic unit produced that acoustic sequence. Thus, different paths through the context-dependent phone model correspond to different acoustic realizations of a context-dependent phone. A common topology for such a context-dependent phone model is shown FIG. 13B. The full mapping transducer A is an appropriate algebraic combination (Kleene closure of sum) of context-dependent phone models.

Figure 13C:
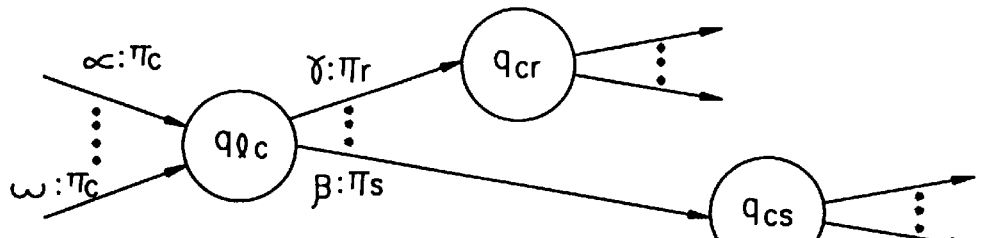
FIG. 13C shows a conversion finite-state transducer C that converts sequences of context-dependent phonetic unit to context-independent phonetic units.

FIG. 13C shows a form of the conversion transducer C for triphonic context-dependent models. For each context-dependent phone model γ, corresponding to the (context-independent) phone $\pi_c$ in the context of $\pi_l$ and $\pi_r$, there is a state $q_{lc}$ in C for the biphone $\pi_l\pi_c$, a state $q_{cr}$ for the biphone $\pi_c\pi_r$, and a transition from $q_{lc}$ to $q_{cr}$ with input label γ and an output label $\pi_r$. Thus, finite-state transducers of this and related forms can be used to map context-independent phonetic representations to context-dependent representations for a variety of medium-to-large vocabulary speech recognition tasks. Full-context dependency, with its well-known accuracy advantages, can then be provided, without having to build a special-purpose context-dependency machinery in the recognizer.

In particular, weighted rewrite rules efficiently build the context-dependent phone models described above. Using the above-outlined weighted rewrite rule compiler 270, the weighted rewrite rules can be transformed into weighted finite-state transducers that should improve the performance of the speech recognition system. Furthermore, because other components of the system will also be finite-state transducers, these weighted finite-state transducers can be composed with those other finite-state transducers.

Conventionally, most automatic speech recognition systems use a very limited context-dependent model. This arises because using more complex models is difficult in systems that do not support finite-state transducers. It also arises because building a context-dependent phone model by hand is very difficult. The above-outlined compilation method and compiler 270 allow the rewrite rules to be easily and quickly converted into finite-state transducers, which enables the efficient construction of any model equivalent to a weighted finite-state.

Figure 13D:
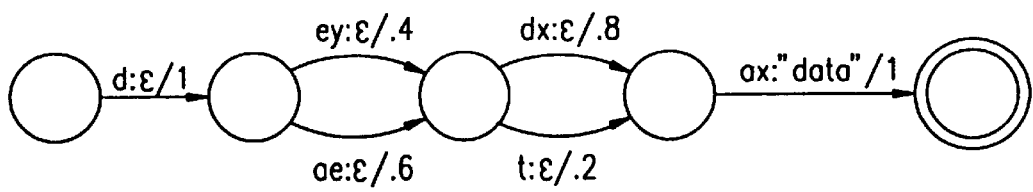
FIG. 13D shows a word sequence finite-state transducer D which converts context-independent phonetic unit sequences to word sequences.

The word sequence transducer D shown in FIG. 13D, which converts phone sequences to word sequences, is defined similarly to the mapping transducer A described above. That is, word models can be built as finite-state transducers inputting sequences of phone labels and outputting a specific word or word sequence. Such a finite-state transducer assigns to each phone sequence a likelihood that a specified word produced it. Thus, different paths through a word model correspond to different phonetic realizations of that word. In particular, FIG. 13D shows a typical word model. These word models are then algebraically combined to form the full word transducer D.

Finally, a language model M, which may be, for example, an n-gram model of word sequence statistics, is easily represented as a weighted acceptor. Thus, the overall recognition task can be expressed as the search for the highest-likelihood string in the composition "O°A°C°M of the various finite-state transducers described above. This composition is an acceptor assigning each word sequence the likelihood that it could have been generated given the acoustic observations input to the composition. The standard Viterbi approximation can be used to search for the highest-probability path, rather than for the highest-probability string.

Figure 14:
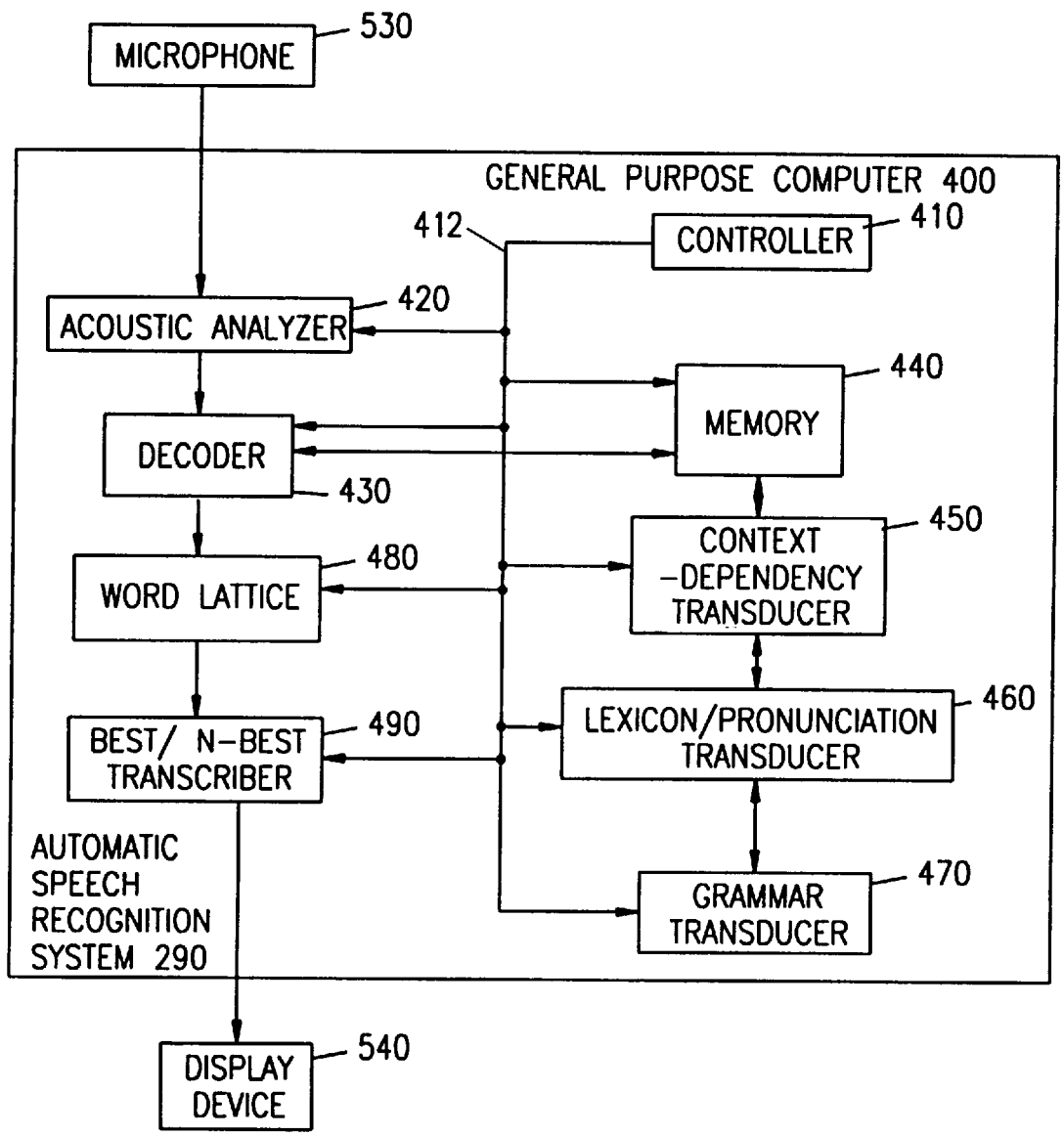
FIG. 14 shows a preferred embodiment of the structural organization of a general purpose computer implementing an automatic speech recognition system.

FIG. 14 shows one preferred embodiment of the functional organization of an automatic speech recognition system 290 implemented on a general purpose computer 400. As shown in FIG. 14, a microphone 530 picks up acoustic energy, presumably from a person speaking into the microphone, and outputs speech waveforms to an acoustic analyzer 420. A controller 410 controls the acoustic analyzer and the other elements of the automatic speech recognition system 290 via a control bus 412. The output of the acoustic analyzer 420 is input into a decoder 430, which outputs the weighted acceptor O describing the acoustic observation sequence. This is then output and stored to a memory 440. The context-dependency transducer 450, the lexicon/pronunciation transducer 460 and the grammar transducer 470 implement the A and C transducers described above. The output of applying these transducers to the weighted acceptor O stored in the memory 440 is output through the decoder 430 to the word lattice 480, which implements the word sequence transducer D. The output of the word lattice 480 is an output to a best/N-best transcriber 490, which applies the Viterbi approximation to determine the highest probability path. This path is then output as the recognized text to a display device 540 for observation by an observer, such as the person who spoke into the microphone 530.

Figure 15:
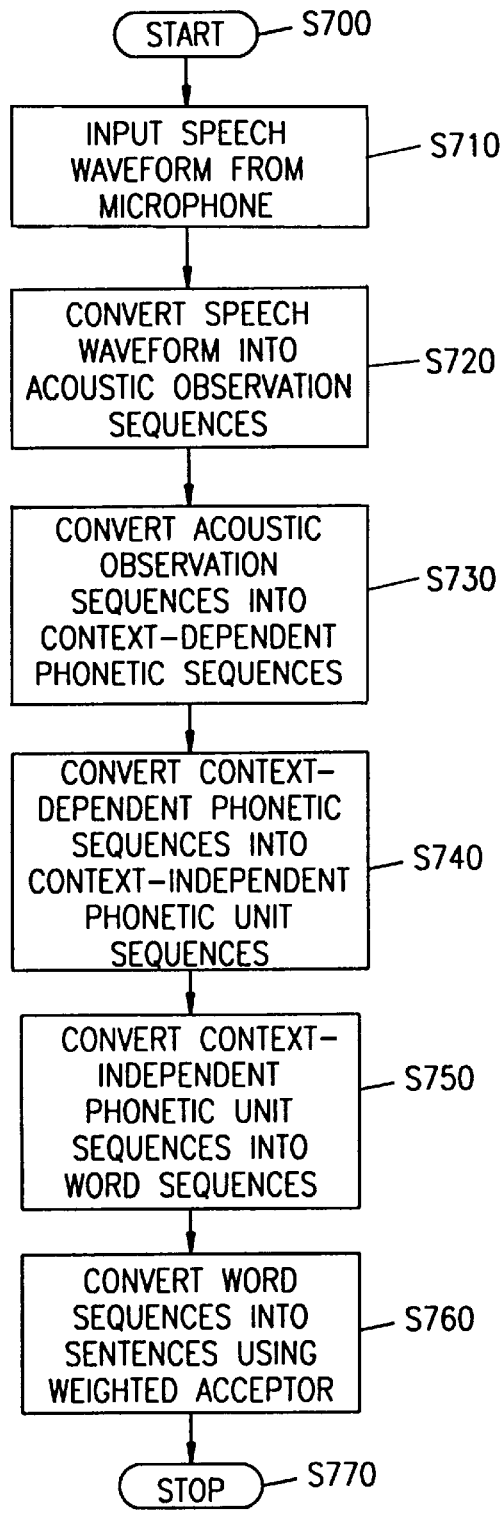
FIG. 15 is a flow chart outlining a preferred embodiment of a method of automatic speech recognition using weighted rewrite rules compiled according to this invention.

The method for generating text from speech using finite-state transducers compiled from weighted rewrite rules using the compilation method and compiler 270 described above is shown in FIG. 15. In particular, in the flow chart outlined in FIG. 15, starting from step S700, in step S710, a speech waveform is input from a microphone. Then, in step S720, the speech waveform is converted into acoustic observation sequences, which are implemented using a weighted finite-state acceptor.

Next, in step S730, the acoustic observation sequences are converted into context-dependent phonetic sequences using a weighted finite-state transducer compiled from a series of weighted context-dependent rewrite rules. Then, in step S740, the context-dependent phonetic sequences are converted into context-independent phonetic unit sequences, again using a finite-state transducer generated from a sequence context-dependent rewrite rules using the compiler 270 of this invention.

Then, in step S750, the context-independent phonetic unit sequences are converted into word sequences, again using a finite-state transducer generated from context-dependent rewrite rules using the compiler 270 of this invention. Finally, in step S760, the word sequences are converted into sentences using a weighted acceptor. Then, in step S770, the process stops.

It should be appreciated that, while the above described preferred embodiments are directed to implementations using a general purpose computer, any device capable of implementing the r, f, Replace, $l_1$ and $l_2$ finite-state transducers to convert weighted rewrite rules into finite-state transducers could be used to implement the compiler 270 of this invention. Furthermore, any device capable of implementing a compiled finite-state transducer can be used to implement the text-to-speech synthesizer 280 or the automatic speech recognition system 290.

In particular, the computer 270, the text-to-speech synthesizer 280 and the automatic speech recognizer 290 can also be implemented on a special purpose computer, a programmed microprocessor or microcontroller and peripheral integrated circuit elements, and ASIC or other integrated circuit, a hardwired electronic or logic circuit such as a discrete element circuit, a programmable logic device such as a PLD, PLA, FPGA or PAL, or the like. In general, any device on which a phonetic state machine capable of implementing the transducers shown in FIG. 3B and 13 and the flowcharts shown in FIGS. 12 and 15 can be used to implement the computer 270, the text-to-speech synthesizer 280 and the automatic speech recognizer 290.

While this invention has been described in conjunction with the specific embodiments outline above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A method for compiling a context dependent rewrite rule having a right context portion, a left context portion, a replaced portion and a replacement portion into a finite-state transducer capable of rewriting an input string into an output string based on the context dependent rewrite rule, comprising:

forming a right context marking finite-state transducer based on the right context portion, the right context marking finite-state transducer capable of inserting a right context marker into the input string before each occurrence of the right context portion in the input string;

forming a replaced portion marking finite-state transducer based on the replaced portion and the right context marker, the replaced portion marking finite-state transducer capable of inserting a pair of left context markers into the input string before an occurrence in the input string of the replaced portion when that occurrence of the replaced portion is followed by the right context marker;

forming a replace finite-state transducer based on the replaced portion, the right context marker and the left context markers, the replace finite-state transducer capable of replacing an occurrence in the input string of the replaced portion with the replacement portion when that occurrence of the replaced portion is preceded by the left context markers and is followed by the right context marker;

forming a left context presence verifying finite-state transducer based on the left context portion, the left context presence verifying finite-state transducer capable of accepting the input string containing the replacement portion in place of the replaced portion when a first left marker symbol is preceded by the left context portion in the input string; and forming a left context absence verifying finite-state transducer based on the left context portion, the left context absence verifying finite-state transducer capable of rejecting the input string containing the replacement portion in place of the replaced portion when a second left marker symbol is not preceded by the left context portion in the input string.

2. The method of claim 1, further comprising composing the right context marking finite-state transducer, the replaced portion marking finite-state transducer, the replace finite-state transducer, the left context presence verifying finite-state transducer and the left context absence verifying finite-state transducer into a single rewriting transducer.

3. The method of claim 2, further comprising:

inputting a plurality of context dependent rewrite rules;

compiling each of the plurality of context dependent rewrite rules into a plurality of finite-state rewriting transducers; and forming a finite-state rewriting transducer system as the union of the plurality of finite-state rewriting transducers.

4. The method of claim 1, wherein the step of forming the right context marking finite-state transducer comprises:

forming a first finite-state transducer that accepts an occurrence of the right context portion in the input string;

reversing the first finite-state transducer;

inserting at least one marker adding state into the reversed first finite-state transducer, each at least one marker adding state adding the right context marker after each occurrence of the right context portion to any input string accepted by the reversed first finite state transducer; and reversing the marked finite-state transducer to form the right context marking finite-state transducer.

5. The method of claim 4, wherein the step of inserting at least one marker adding state comprises:

creating a copy state for each final state of the reversed first finite-state transducer;

changing each copied final state to a non-final state and each non-final state to a final state;

deleting any transitions leaving a copied final state;

deleting any transitions entering a copy state; and adding a transition from a copied final state to the corresponding copy state, the added transition adding the right context marker to the input string before the right context portion.

6. The method of claim 5, wherein the step of copying a final state comprises:

forming the copy state;

copying each transition, extending from another state and entering the copied final state, as a new transition extending from the other state to the copy state;

copying each transition, leaving the copied final state and extending to another state, as a new transition extending to the other state from the copy state; and copying each transition looping at the copied final state as a new transition from the copy state to the copied final state.

7. The method of claim 1, wherein the step of forming the replaced portion marking finite-state transducer comprises:

forming a first finite-state transducer that accepts an occurrence of the replaced portion followed by a right marker symbol in the input string;

reversing the first finite-state transducer;

inserting at least one marker adding state into the reversed first finite-state transducer, each at least one marker adding state adding the left context markers to any input string accepted by the reversed first finite state transducer; and reversing the marked finite-state transducer to form the replaced portion finite-state transducer.

8. The method of claim 7, wherein the step of forming a first finite-state transducer includes forming the first finite-state transducer so that it ignores, in the input string, any intervening right marker symbols within a multisymbol replaced portion.

9. The method of claim 7, wherein the step of inserting at least one marker adding state comprises:

creating a copy state for each final state of the reversed first finite-state transducer;

changing each copied final state to a non-final state and each non-final state to a final state;

deleting any transitions leaving a copied final state;

deleting any transitions entering a copy state; and adding a transition from a copied final state to the corresponding copy state, the added transition adding the left context markers to the input string before the replaced portion.

10. The method of claim 9, wherein the step of copying a final state comprises:

forming the copy state;

copying each transition, extending from another state and entering the copied final state, as a new transition extending from the other state to the copy state;

copying each transition, leaving the copied final state and extending to another state, as a new transition extending to the other state from the copy state; and copying each transition looping at the copied final state as a new transition from the copy state to the copied final state.

11. The method of claim 1, wherein the step of forming the left context presence verifying finite-state transducer comprises:

forming a first finite-state transducer that accepts an occurrence of the left context portion in the input string;

deleting from each final state transitions to other states that identically accept the first left marker symbol;

adding a looping transition to each final state of the first finite-state transducer, the added looping transition deleting occurrences of the first left marker symbol in the input string that follow the left context portion; and making each non-final state a final state.

12. The method of claim 1, wherein the step of forming the left context absence verifying finite-state transducer comprises:

forming a first finite-state transducer that accepts an occurrence of the left context portion in the input string;

deleting from each non-final state transitions to other states that identically accept the second left marker symbol;

adding a looping transition to each non-final state of the first finite-state transducer, the added looping transition deleting occurrences of the second left marker symbol in the input string that do not follow the left context portion; and making each non-final state a final state.

13. The method of claim 1, wherein, when the input context dependent rewrite rule is a weighted context dependent rewrite rule having a plurality of weighted replacement portions, the step of forming the replace finite-state transducer comprises forming for each replacement portion, a rewrite transition inputting the replaced portion and outputting that replacement portion, each rewrite transition assigned the corresponding weight of that replacement portion.

14. The method of claim 13, wherein the weighted replace finite-state transducer is capable of replacing an occurrence in the input string of the replaced portion with a plurality of weighted replacement portions when that occurrence of the replaced portion is preceded by the left context markers and is followed by the right context marker.

15. A compiler that generates a set of finite-state transducers from an input context dependent rewrite rule having a right context portion, a left context portion, a replaced portion and a replacement portion, the set of finite-state transducers capable of rewriting an input string into an output string based on the context dependent rewrite rule, the compiler comprising:

a right context marking finite-state transducer generator that converts the right context portion into a right context marking finite-state transducer capable of inserting a right context marker into the input string before each occurrence of the right context portion in the input string;

a replaced portion marking finite-state transducer generator that converts the replaced portion and the right context marker into a replaced portion marking finite-state transducer capable of inserting a pair of left context markers into the input string before an occurrence in the input string of the replaced portion when that occurrence of the replaced portion is followed by the right context marker;

a replace finite-state transducer generator that converts the replaced portion, the right context marker and the left context markers into a replace finite-state transducer capable of replacing an occurrence in the input string of the replaced portion with the replacement portion when that occurrence of the replaced portion is preceded by the left context markers and is followed by the right context marker;

a left context presence verifying finite-state transducer generator that converts the left context portion and a first left marker symbol into a left context presence verifying finite-state transducer capable of accepting the input string containing the replacement portion in place of the replaced portion when the first left marker symbol is preceded by the left context portion in the input string; and a left context absence verifying finite-state transducer generator that converts the left context portion and a second left marker symbol into a left context absence verifying finite-state transducer capable of rejecting the input string containing the replacement portion in place of the replaced portion when the second left marker symbol is not preceded by the left context portion in the input string.

16. The compiler of claim 15, further comprising means for composing the right context marking finite-state transducer, the replaced portion marking finite-state transducer, the replace finite-state transducer, the left context presence verifying finite-state transducer and the left context absence verifying finite-state transducer into a single rewriting transducer.

17. The compiler of claim 16, further comprising means for forming a finite-state rewriting transducer system as the union of a plurality of finite-state rewriting transducers.

18. The compiler of claim 15, wherein the right context marking finite-state transducer generator comprises:

means for forming a first finite-state transducer that accepts an occurrence of the right context portion in the input string;

a reverse transducer generator that reverses the first finite-state transducer; and a marker transducer generator that inserts at least one marker adding state into a reversed first finite-state transducer, each at least one marker adding state adding the right context marker after each occurrence of the right context portion to any input string accepted by the reversed first finite state transducer;

wherein the marked reversed first finite-state transducer in input to the reverse transducer generator, the reverse transducer generator outputting the right context marking finite-state transducer.

19. The compiler of claim 18, wherein the marker transducer generator comprises:

means for creating a copy state for each final state of the reversed first finite-state transducer;

means for changing each copied final state to a non-final state and each non-final state to a final state;

means for deleting any transitions leaving a copied final state;

means for deleting any transitions entering a copy state; and means for adding a transition from a copied final state to the corresponding copy state, the added transition adding the right context marker to the input string before the right context portion.

20. The compiler of claim 19, wherein the means for copying a final state comprises:

means for forming the copy state;

means for copying each transition, extending from another state and entering the copied final state, as a new transition extending from the other state to the copy state;

means for copying each transition, leaving the copied final state and extending to another state, as a new transition extending to the other state from the copy state; and means for copying each transition looping at the copied final state as a new transition from the copy state to the copied final state.

21. The compiler of claim 15, wherein the replaced portion marking finite-state transducer generator comprises:

means for forming a first finite-state transducer that accepts an occurrence of the replaced portion followed by a right marker symbol in the input string;

a reverse transducer generator that reverses the first finite-state transducer; and a marker transducer generator that inserts at least one marker adding state into the reversed first finite-state transducer, each at least one marker adding state adding the left context markers to any input string accepted by the reversed first finite state transducer;

wherein the marked reversed first finite-state transducer in input to the reverse transducer generator, the reverse transducer generator outputting the replaced portion marking finite-state transducer.

22. The compiler of claim 21, wherein the means for forming a first finite-state transducer forms the first finite-state transducer so that it ignores, in the input string, any intervening right marker symbols within a multisymbol replaced portion.

23. The compiler of claim 21, wherein the means for inserting at least one marker adding state comprises:

means for creating a copy state for each final state of the reversed first finite-state transducer;

means for changing each copied final state to a non-final state and each non-final state to a final state;

means for deleting any transitions leaving a copied final state;

means for deleting any transitions entering a copy state; and means for adding a transition from a copied final state to the corresponding copy state, the added transition adding the left context markers to the input string before the replaced portion.

24. The compiler of claim 23, wherein the means for copying a final state comprises:

means for forming the copy state;

means for copying each transition, extending from another state and entering the copied final state, as a new transition extending from the other state to the copy state;

means for copying each transition, leaving the copied final state and extending to another state, as a new transition extending to the other state from the copy state; and means for copying each transition looping at the copied final state as a new transition from the copy state to the copied final state.

25. The compiler of claim 15, wherein the left context presence verifying finite-state transducer generator comprises:

means for forming a first finite-state transducer that accepts an occurrence of the left context portion in the input string;

means for deleting from each final state transitions to other states that identically accept the first left marker symbol;

means for adding a looping transition to each final state of the first finite-state transducer, the added looping transition deleting occurrences of the first left marker symbol in the input string that follow the left context portion; and means for making each non-final state a final state.

26. The compiler of claim 15, wherein the left context absence verifying finite-state transducer generator comprises:

means for forming a first finite-state transducer that accepts an occurrence of the left context portion in the input string;

means for deleting from each non-final state transitions to other states that identically accept the second left marker symbol;

means for adding a looping transition to each non-final state of the first finite-state transducer, the added looping transition deleting occurrences of the second left marker symbol in the input string that do not follow the left context portion; and means for making each non-final state a final state.

27. The compiler of claim 15, wherein, when the input context dependent rewrite rule is a weighted context dependent rewrite rule having a plurality of weighted replacement portions, the replace finite-state transducer generator comprises means for forming, for each replacement portion, a rewrite transition inputting the replaced portion and outputting that replacement portion, each rewrite transition assigned the corresponding weight of that replacement portion.

28. The compiler of claim 27, wherein the weighted replace finite-state transducer is capable of replacing an occurrence in the input string of the replaced portion with a plurality of weighted replacement portions when that occurrence of the replaced portion is preceded by the left context markers and is followed by the right context marker.

* * * * *